(12) United States Patent
Beyk

(10) Patent No.: US 8,197,700 B2
(45) Date of Patent: Jun. 12, 2012

(54) COMPUTATIONAL METHOD FOR SIZING THREE-PHASE SEPARATORS

(75) Inventor: Mehryar Beyk, Dhahran Hills Camp (SA)

(73) Assignee: Saudi Arabian Oil Company (SA)

( * ) Notice: Subject to any disclaimer, the term of this patent is extended or adjusted under 35 U.S.C. 154(b) by 1555 days.

(21) Appl. No.: 11/647,629

(22) Filed: Dec. 29, 2006

(65) Prior Publication Data

US 2007/0271324 A1 Nov. 22, 2007

Related U.S. Application Data

(60) Provisional application No. 60/755,657, filed on Dec. 30, 2005.

(51) Int. Cl.
*B01D 19/00* (2006.01)
*G06F 17/50* (2006.01)

(52) U.S. Cl. ............... 210/800; 95/253; 700/97; 703/1

(58) Field of Classification Search ............ 210/86, 210/87, 104, 138, 143, 513, 521, 522, 532.1, 210/539, 703, 739, 800; 95/253; 96/182, 96/183; 703/1, 2, 5, 9, 13; 700/273, 281, 700/97, 98, 118; 717/104
See application file for complete search history.

(56) References Cited

U.S. PATENT DOCUMENTS

| | | | | |
|---|---|---|---|---|
| 5,679,258 A * | 10/1997 | Petersen | ................ | 210/703 |
| 5,774,633 A * | 6/1998 | Baba et al. | ................ | 706/25 |
| 6,673,240 B2 * | 1/2004 | Fassbender et al. | ............ | 210/87 |
| 6,928,399 B1 * | 8/2005 | Watts et al. | ................ | 703/2 |
| 7,003,359 B2 * | 2/2006 | Phelps et al. | ................ | 700/97 |
| 7,110,835 B2 * | 9/2006 | Blevins et al. | ................ | 700/83 |
| 7,162,402 B2 * | 1/2007 | Daems et al. | ................ | 703/13 |
| 7,526,359 B2 * | 4/2009 | Landers et al. | ................ | 700/182 |
| 7,654,397 B2 * | 2/2010 | Allouche | ................ | 96/157 |
| 7,698,110 B2 * | 4/2010 | Connor et al. | ................ | 703/1 |
| 2003/0109948 A1 * | 6/2003 | Phelps et al. | ................ | 700/97 |
| 2005/0288912 A1 * | 12/2005 | Asprion et al. | ................ | 703/9 |
| 2006/0025975 A1 * | 2/2006 | Rey-Fabret et al. | ............ | 703/9 |
| 2007/0186149 A1 * | 8/2007 | Ghantous et al. | ............ | 715/502 |

FOREIGN PATENT DOCUMENTS

EP 0 786 782 A1 7/1997

OTHER PUBLICATIONS

Ernst Hansen, "Separation Offshore Survey-Design/Redesign of Gravity Separators", Exploration & Production: The Oil and Gas Review 2006.* Giovani Cavalcanti Nunes, Process Control in E & P: Recent Developments and Trends, Cenpes, Cidade Universitaria, Quadra 7, Ilha do Fundoa, 2149-900, Rio de Janeiro, R. J.—Brazil.* Cheremisinoff, Nicholas P., "Handbook of Chemical Processing equipment", 2000, Elsevier Butterworth-Heinemann, XP002438444, p. VII.

* cited by examiner

*Primary Examiner* — Joseph Drodge
(74) *Attorney, Agent, or Firm* — Bracewell & Giuliani LLP

(57) ABSTRACT

A method and software for sizing three-phase separators utilizing an iterative approach is provided. The proposed computational method for sizing three-phase separators uses an iterative technique that calculates the optimum vessel dimensions for each service over a range of length to diameter ratios. The method starts with the smallest vessel dimension depending on the service and the selected vessel type and then tries to satisfy all the requirements for vapor/liquid and liquid/liquid separation. The vessel dimensions, i.e., length and diameter, are incrementally changed until all the requirements are met. The method and software are not restricted to any fixed value for the length to diameter ratio. The method and software select the smallest sized three-phase separator required for each service.

21 Claims, 11 Drawing Sheets

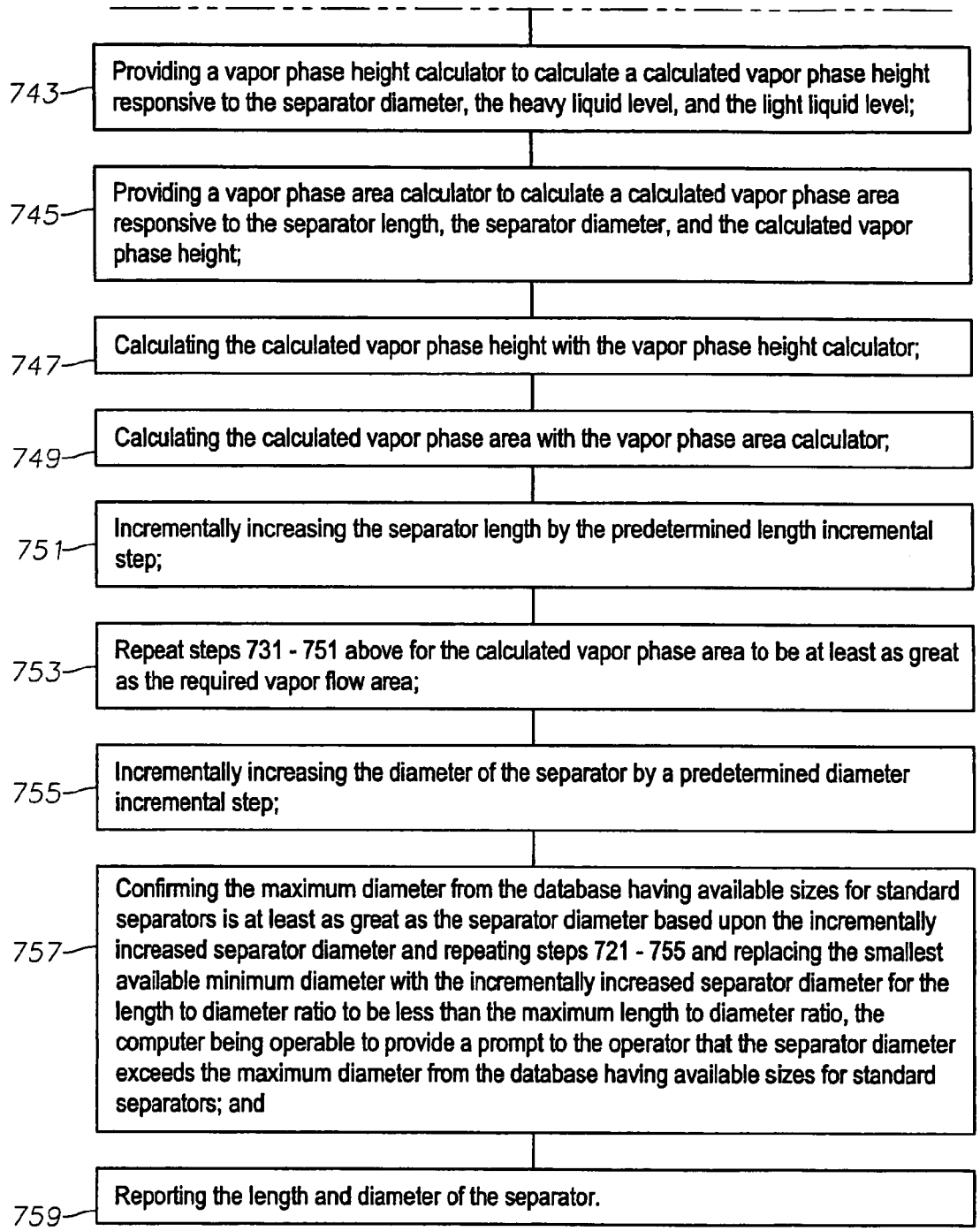
Fig. 9C   ⬉—711

COMPUTATIONAL METHOD FOR SIZING THREE-PHASE SEPARATORS

RELATED APPLICATIONS

This application is related to and claims priority and benefit of U.S. Provisional Patent Application Ser. No. 60/755,657, filed Dec. 30, 2005, titled "Computational Method For Sizing Three-Phase Separators," which is incorporated herein by reference in its entirety.

TECHNICAL FIELD OF THE INVENTION

The present invention relates to software for, and a method and software for sizing separators. More specifically, the present invention relates to a method and associated software for sizing a three-phase separator utilizing a robust iterative technique.

BACKGROUND OF THE INVENTION

Three-phase separators are widely used in the petrochemical and oil and gas industries. Engineers often face the problem of designing new separators or verifying the fitness-for-service of existing separators for new service conditions that the separator was not originally designed to handle. Obtaining the smallest vessel size suitable for each service is a time consuming task, which can have a significant impact on the overall cost of projects.

One of the most common approaches to sizing three-phase separators is to use a trial and error technique that requires that the designer estimate the separator dimensions. The programs then calculate the maximum allowable velocity of each phase based on the required residence times and usual vapor-liquid separation. It is based on these allowable velocities that the programs decide whether the separator is large enough for operating conditions or design conditions. This prior art approach does not provide the optimum vessel size and requires several attempts by the user to come up with the right combination of diameter and length. Another limitation of these tools is that they mostly work based on a fixed length to diameter ratio.

SUMMARY OF THE INVENTION

The invention includes a computerized method of sizing a three-phase separator. The method includes the step of providing a computer having a database defining fields. At least a portion of the fields have available preselected sizes for a plurality of predefined standard separators. The fields also have a preselected length to diameter ratio, a minimum required light liquid level for a light liquid phase, and a minimum required heavy liquid level for a heavy liquid phase associated with each of the preselected sizes for the predefined standard separators. The computer also has memory with instructions stored therein. The instructions include a design conditions calculator to calculate preselected design conditions of a fluid entering the predefined standard separator responsive to predetermined values entered by an operator. The instructions also include a separation time calculator to calculate the rising time of the light liquid droplets in the heavy liquid and the settling time of the heavy liquid droplets in the light liquid responsive to a calculated light liquid holdup volume and a calculated heavy liquid holdup volume that are calculated by a holdup volume calculator. The instructions further include a terminal velocity calculator to calculate the terminal velocity of the vapor responsive to the predetermined values entered by an operator. Moreover, the instructions include a required vapor flow area calculator to calculate the required vapor flow area responsive to the terminal velocity of the vapor. Furthermore, the instructions include a minimum dimension retriever that retrieves a smallest available length and a smallest available diameter for a separator from the database responsive to the length to diameter ratios entered by the operator.

The method includes the step of an operator entering the predetermined values and a range of length to diameter ratios defined by a minimum length to diameter ratio and a maximum length to diameter ratio. The minimum and maximum length to diameter ratios are defined by the operator.

The method includes the step of calculating the design conditions with the design conditions calculator. These calculations are responsive to the predetermined values entered by the operator. The design conditions include a required light liquid holdup volume, a required light liquid surge volume, a required heavy liquid holdup volume, a required heavy liquid surge volume, and a required total light liquid volume.

The method includes the step of retrieving from the fields the smallest available minimum diameter and the smallest available minimum length with the minimum dimension retriever responsive to the range of length to diameter ratios entered by the operator.

The method includes the step of retrieving from the fields the minimum required light liquid level and the minimum required heavy liquid level. The minimum light and heavy liquid levels are responsive to the smallest available minimum length and smallest available minimum diameter determined based upon the length to diameter ratio.

The method includes the step of calculating a volume of the heavy liquid and a volume of the light liquid. The volume of the heavy and light liquids are responsive to the length of the separator, and the diameter of the separator. The volume of the heavy and light liquids are also responsive to the minimum required light liquid level and the minimum required heavy liquid level. The volume of the heavy liquid defines a calculated heavy liquid holdup volume and the volume of the light liquid defines a calculated light liquid holdup volume. The heavy liquid holdup and light liquid holdup volumes being responsive to the dimensions of the separator.

The method includes the step of incrementally in :ceasing the minimum required heavy liquid level and repeating or going back to the step of calculating the volume of the heavy liquid and the volume of the light liquid as described above, until the calculated heavy liquid holdup volume is at least as great as the required heavy liquid holdup volume.

The method includes the step of incrementally increasing the minimum required light liquid level and repeating or going back to the step of calculating the volume of the heavy liquid and the volume of the light liquid as described above, and continuing the process back to this step, for the calculated light liquid holdup volume to be at least as great as the required total light liquid volume.

The method includes the step of calculating the rising time of the light liquid droplets in the heavy liquid and the settling time of the heavy liquid droplets in the light liquid responsive to the calculated light liquid and heavy liquid holdup volumes.

The method includes the step of incrementally increasing the length of the separator by a predetermined length incremental step.

The method includes the step of confirming the length to diameter ratio based upon the incrementally increased separator length is less than the maximum length to diameter ratio entered by the operator. Then repeating or going back to the step of calculating the volume of the heavy liquid and the volume of the light liquid as described above, and continuing the process back to this step, and replacing the smallest available minimum length with the incrementally increased separator length for the rising time of the light liquid droplets in the heavy liquid to be less than the heavy liquid resistance time and the settling time of the heavy liquid droplets in the light liquid to be less than the light liquid residence time.

The method includes the step of incrementally increasing the diameter of the separator by a predetermined diameter incremental step.

The method includes the step of confirming the maximum diameter from the database having available sizes for standard separators is at least as great as the separator diameter based upon the incrementally increased separator diameter. There repeating or going back to the step of retrieving the minimum required light and heavy liquid levels as described above, and continuing the process back to this step, And replacing the smallest available minimum diameter with the incrementally increased separator diameter for the length to diameter ratio to be less than the maximum length to diameter ratio, the computer being operable to provide a prompt to the operator that the separator diameter exceeds the maximum diameter from the database having available sizes for standard separators.

The method includes the step of calculating the terminal velocity of the vapor responsive to the predetermined values entered by the operator.

The method includes the step of calculating the required vapor flow area responsive to the terminal velocity of the vapor.

The method includes the step of providing a vapor phase height calculator to calculate a calculated vapor phase height responsive to the separator diameter, the heavy liquid level, and the light liquid level.

The method includes the step of providing a vapor phase area calculator to calculate a calculated vapor phase area responsive to the separator length, the separator diameter, and the calculated vapor phase height.

The method includes the step of calculating the calculated vapor phase height with the vapor phase height calculator.

The method includes the step of calculating the calculated vapor phase area with the vapor phase area calculator.

The method includes the step of incrementally increasing the separator length by the predetermined length incremental step.

The method includes the step of repeating or going; back to the step of incrementally increasing the separator length followed by confirming the length to diameter ratio as described above, and continuing the prows back to this step, for the calculated vapor phase area to be at least as great as the required vapor flow area.

The method includes the step of incrementally increasing the diameter of the separator by a predetermined diameter incremental step.

The method includes the step of confirming the maximum diameter from the database having available sizes for standard separators is at least a great as the separator diameter based upon the incrementally increased separator diameter. Then repeating or going back to the step of incrementally increasing the separator length followed by confirming the length to diameter ratio as described above, and continuing the process hack to this step, and replacing the smallest available minimum diameter with the incrementally increased separator diameter fir the length to diameter ratio to be less than tie maximum length to diameter ratio, the computer being operable to provide a prompt to the operator that the separator diameter exceeds the maximum diameter from the database having available sizes for standard separators.

The method includes the final step of reporting the length and diameter of the separator.

The invention also includes software for placement on memory of a computer to size a three-phase separator. The software has a design conditions calculator to calculate preselected design conditions of a fluid entering a three-phase separator responsive to predetermined values entered by an operator. The software has a separation time calculator to calculate the rising time of a plurality of light liquid droplets in a heavy liquid in the fluid entering the three-phase separator. The separation time calculator also calculates the settling time of a plurality of heavy liquid droplets in a light liquid in the fluid entering the three-phase separator responsive to a calculated light liquid holdup volume and a calculated heavy liquid holdup volume that are calculated by the design conditions calculator.

The software also includes a terminal velocity calculator to calculate the terminal velocity of a vapor in the fluid entering the three-phase separator responsive to the predetermined values entered by the operator. The software further includes a required vapor flow area calculator to calculate the required vapor flow area responsive to the terminal velocity of the vapor. Moreover, the software has a minimum dimension retriever to retrieve a smallest available length and a smallest available diameter for a separator from the database responsive to the length to diameter ratios entered by the operator.

The software also include a minimum required liquid level retriever to retrieve the minimum required light liquid level and the minimum required heavy liquid level responsive to the smallest available minimum length and smallest available minimum diameter determined responsive to the length to diameter ratio. The software includes a holdup volume calculator to calculate a volume of the heavy liquid and a volume of the light liquid. The holdup volume calculator is responsive to a length and a diameter from the minimum dimension retriever. The holdup volume calculator is also responsive to the minimum required light liquid level and the minimum required heavy liquid level from the minimum required liquid level retriever. The volume of the heavy liquid defining a calculated heavy liquid holdup volume and the volume of the light liquid defining a calculated light liquid holdup volume.

The software further includes a vapor phase area calculator to calculate a calculated vapor phase area responsive to the length and diameter of the separator, and a calculated vapor phase height.

In a further aspect of the invention, the software can also include a heavy liquid level incrementor to incrementally increase the minimum required heavy liquid level in order for the calculated heavy liquid holdup volume to be at least as great as the required total light liquid volume, and a light liquid level incrementor to incrementally increase the minimum required heavy liquid level in order for the calculated light liquid holdup volume to be at least as great as the required total light liquid volume According to a further aspect of this invention, the software further includes a diameter incrementor to incrementally increase the diameter of the separator by a predetermined diameter incremental step so that increases in the separator diameter are no longer necessary for the length to diameter ratio to be less than the maximum length to diameter ratio. According to this same further aspect of the invention, the software also includes a length incrementor to incrementally increase the length of the separator by a predetermined length incremental step so that increases in the separator length are no longer necessary for the smallest available minimum diameter to at least as great as a total of (1) a minimum vapor height guess value; (2) the minimum required light liquid level minus the minimum required heavy liquid level; and (3) the minimum required heavy liquid level. The length incrementor incrementally increases the length of the separator so that incremental increases in the separator length are no longer necessary for the rising time of the light liquid droplets in the heavy liquid from the separation time calculator to be less than a heavy liquid resistance time and the settling time of the heavy liquid droplets in the light liquid from the separation time calculator to be less than a light liquid residence time. Moreover, the length incrementor incrementally increases the length of the separator so that incremental increases in the separator length are no longer necessary for the calculated vapor phase area from the vapor phase area calculator to be at least as great as the required vapor flow area from the required vapor flow area calculator.

The invention provides a method for sizing three-phase separators utilizing an iterative approach. The method starts with the smallest vessel dimension depending on the service and the selected vessel type and then tries to satisfy all the requirements for vapor/liquid and liquid/liquid separation. The vessel dimensions, i.e., length and diameter, are incrementally changed until all the requirements are met. The methods are not restricted to any fixed value for the LAD (length/diameter) ratio and therefore provide the smallest sized three-phase separator required for each service.

The methods of the present invention can be used on several different types of separators, including a vertical separator having a baffle, a horizontal separator, a horizontal separator having a boot, a horizontal separator having a bucket and split feed flow, and a horizontal separator having a weir.

The proposed computational method for sizing three-phase separators uses an iterative technique that calculates the optimum vessel dimensions for each service over a range of L/D ratios, which is specified by the engineer. It starts with the minimum practical dimensions depending on the type of separator and in each iteration checks all the required criteria with incremented dimensions until all the requirements are met. Most of these requirements are common industry standards which are practiced by major oil companies such as Saudi Aramco. One of the important features of this technique is that it provides the optimum vessel size for an L/D ratio range while all the existing methods work based on fixed values for length and diameter. This means that by choosing a very large range of L/D ratios, the method will calculate the L/D ratio that provides the minimum vessel size for each particular case.

The invention provides optimum separator size for each service. The invention works based on an L/D ratio range specified by the engineer, rather than a fixed L/D ratio. The invention calculates the optimum L/D ratio, which results in minimum separator size. The invention ignores and flags out impractical or unrealistic answers.

This invention addresses the subject of sizing three-phase separators using a robust iterative technique. It can be applied to separators with most well-known internal types such as weirs, buckets and boots. It may not be used for sizing separators with complicated internals or proprietary devices that enhance phase separation. However, for most engineering evaluations and initial cost estimation purposes, simplified internal structures can be used.

BRIEF DESCRIPTION OF THE DRAWINGS

So that the manner in which the above-recited features, advantages, and objectives of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 9A-9C is schematic flow diagram of the method for sizing the separators shown in FIG. 1 when utilizing the system shown in FIG. 6 according to an embodiment of the present invention.

DETAILED DESCRIPTION OF THE INVENTION

Figure 1:
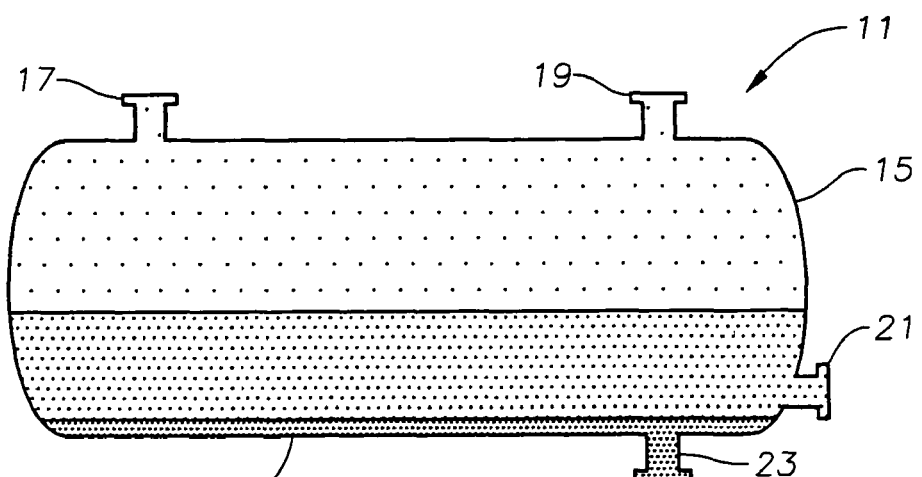
FIG. 1 is a sectional view of a three-phase horizontal separator designed and sized in accordance with an embodiment of the present invention.

FIGS. 1-5 show various schematical layouts of separators used in the petrochemical industry to separate heavy liquids, light liquids, and vapors from fluids during refining. One version of a separator 11 is shown in FIG. 1. Separator 11 in FIG. 1 is a horizontal separator typically used for separation of three-phase fluids. Separator 11 includes a separator body 13 that is typically a tubular member situated horizontally with respect to a supporting structure. A pair of separator end caps 15 are attached to separator body 13 to seal the end portions of separator body 13. Separator 11 preferably includes a separator fluid inlet 17 extending through a sidewall of separator body 13. In separator 11 shown in FIG. 1, fluid inlet 17 extends through an upper wall of separator body 13. Fluid enters separator 11 through fluid inlet 17 for separation within separator 11.

The separation within separator 11 is typically a static separation. Over time, the heavy liquids found within the fluids settle to the bottom portion of separator 11 while the vapors rise to an upper portion of separator 11. Between the vapor portion and the heavy liquid portion separating within the fluid are light liquids found within the fluid entering separator 11. A heavy liquid level is designated by line HL, a light liquid level located between the heavy liquids and the vapor is designated by LL and the vapor is found above light liquid line LL.

Separator 11 preferably includes a vapor outlet 19 in fluid communication with the vapor separated from the fluid entering separator 11. In the version shown in FIG. 1, vapor outlet 19 is located through an upper sidewall of separator body 13. Separator 11 preferably also includes a light liquid outlet 21 in fluid communication with the light liquid separated from the fluid entering separator 11. Light liquid outlet 21 is preferably positioned through a sidewall of separator 11, through end cap 15 in the embodiment shown in FIG. 1, at an elevation for light liquid outlet 21 to be in fluid communication with the light liquids found in separator 11. Separator 11 also preferably includes a heavy liquid outlet 23 positioned to receive heavy liquids separating from the fluid entering separator 11. In the embodiment shown in FIG. 1, heavy liquid outlet 23 extends through the lower sidewall of separator body 13 so that heavy liquids settling along the bottom portion of separator 11 can flow out of separator 11 through heavy liquid outlet 23 due to the force of gravity. As will be readily apparent to those skilled in the art, separator 11 shown in FIG. 1, depends upon time for the heavy liquids to settle and the vapor to rise in order for separation to occur thereby causing separation across three phases of the fluid entering separator 11: a vapor phase, a light liquid phase, and a heavy liquid phase.

Figure 2:
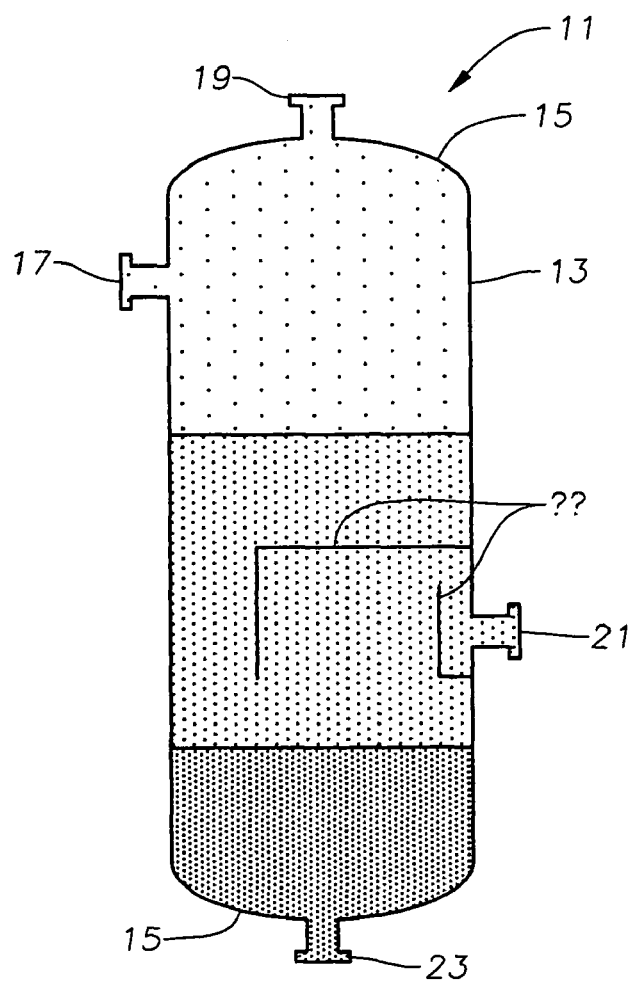
FIG. 2 is a sectional view of a three-phase vertical separator designed and sized in accordance with an embodiment of the present invention.

Referring to FIG. 2, separator 11 is a vertical separator comprising similar features as that shown in FIG. 1. Separator body 13 in the separator shown in FIG. 2 is aligned vertically with respect to a support structure so that separator 11 is a vertical separator. Fluid inlet 17 extends through a sidewall of separator body 13 while vapor outlet 19 and heavy liquid outlet 23 extend through upper and lower end caps 15. Light liquid outlet 21 extends through another sidewall of separator body 13 at a position between vapor outlet 19 and heavy liquid outlet 23. Separator 11 in FIG. 2 also preferably includes a baffle or weir assembly 25 located within the light liquid level found within separator 11. As is readily known in the art, weir assembly 25 aids in the separation of heavy and light liquids. Fluid entering fluid inlet 17 slides axially downward beside weir assembly 25 toward a lower portion of separator 11. After a predetermined amount of time, light liquid droplets found in the heavy liquids are allowed to rise to the light liquid level found in separator 11, and the heavy liquid droplets found in the light liquid are allowed to settle to the heavy liquid level found in separator 11. Weir assembly 25 helps to prevent heavy liquid droplets from entering light liquid outlet 21.

Figure 3:
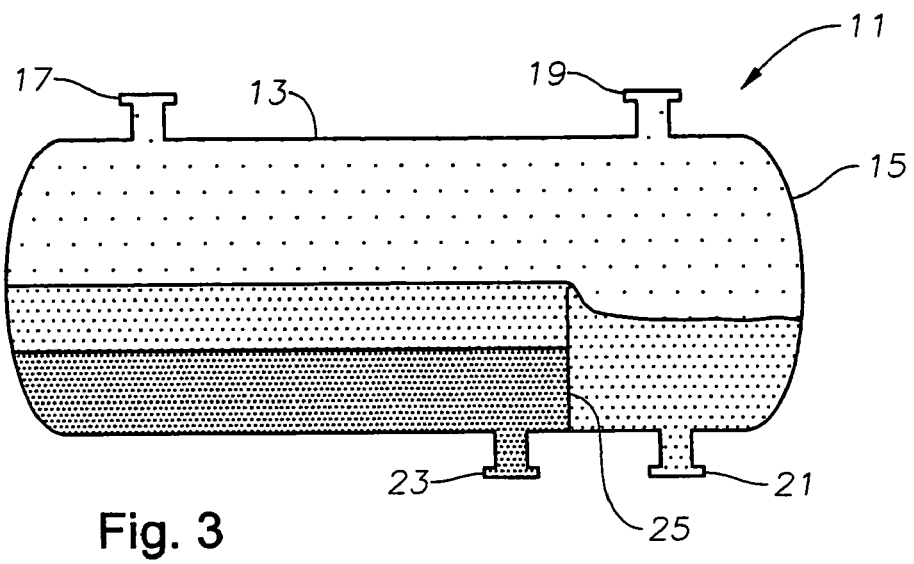
FIG. 3 is a sectional view of a three-phase horizontal separator with a weir internal assembly designed and sized in accordance with an embodiment of the present invention.

Referring to FIG. 3, separator 11 is a horizontal separator similar to that shown in FIG. 1, however, separator 11 in FIG. 3 also includes a baffle or weir assembly 25. Weir assembly 25 extends upward from the lower sidewall of separator body 13 to create a physical barrier that the fluid entering separator 11 will have to flow over in order to reach vapor outlet 19 and light liquid outlet 21. As is readily appreciated by those skilled in the art, the heavy liquids within the fluid entering separator 11 are not capable of flowing over weir assembly 25 so the heavy liquids flow out of heavy liquid outlet 23 located adjacent weir assembly 25. The light liquids found in the fluid entering separator 11 flow over weir assembly 25 and collect in a portion of separator 11 segregated from the heavy liquids in the fluid entering separator 11. The collecting light liquids that have flown over weir assembly 25 exit separator 11 through light liquid outlet 21.

Figure 4:
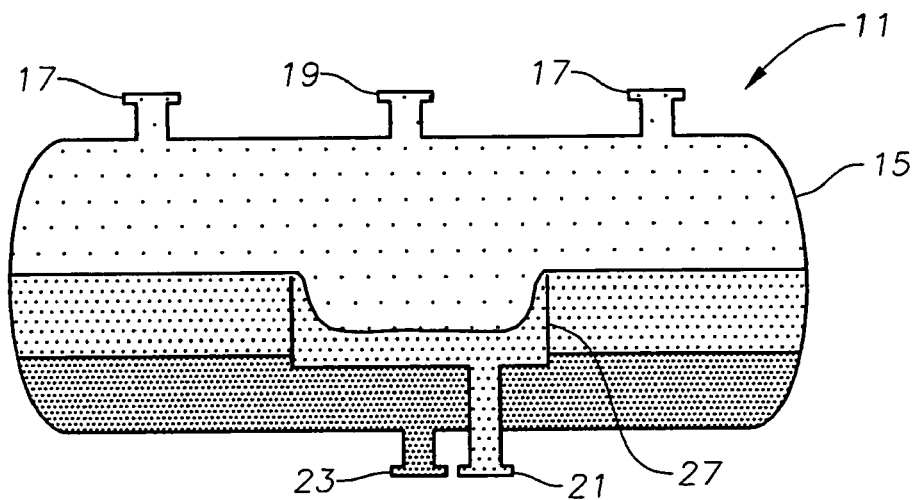
FIG. 4 is a sectional view of a three-phase horizontal separator with a bucket assembly designed and sized in accordance with an embodiment of the present invention.

Separator 11 shown in FIG. 4 is a horizontal separator similar to those shown in FIG. 1 and FIG. 3. Separator 11 in FIG. 4 preferably includes a bucket assembly 27 medially located between the upper and lower sidewalls of separator body 13. Bucket assembly 27 includes a generally bucket shaped assembly positioned within the light liquids and above the heavy liquids separated from the fluids entering separator 11. Bucket assembly 27 also preferably includes a bucket passageway extending axially downward and extending through the lower sidewall of separator body 13 adjacent heavy liquid outlet 23. The lower extending passage of bucket assembly 27 is in fluid communication with light liquid outlet 21 for light liquids to exit separator 11. Separator 11 in FIG. 4 preferably includes a pair of fluid inlets 17 extending through the upper sidewall of separator body 13 at opposite ends of separator 11. Separator 11 also preferably includes vapor outlet 19 centrally located along the upper sidewall of separator body 13. Fluid entering separator 11 feeds into separator 11 through both of fluid inlets 17 and collects toward the lower portion of separator 11. As the liquid level within separator 11 rises, bucket assembly 27 acts as a physical barrier to the heavy liquids within the fluid being in fluid communication with light liquid outlet 21. The lighter liquids separating from the heavy liquids in the fluid entering separator 11 accumulate and overflow into the center portion of bucket assembly 27 for exiting out of separator 11 through light liquid outlet 21. Vapor separates from and accumulates above both the heavy and light liquids separated from the fluid entering separator 11 and exits through vapor outlet 19 located at the top sidewall of separator 11.

Figure 5:
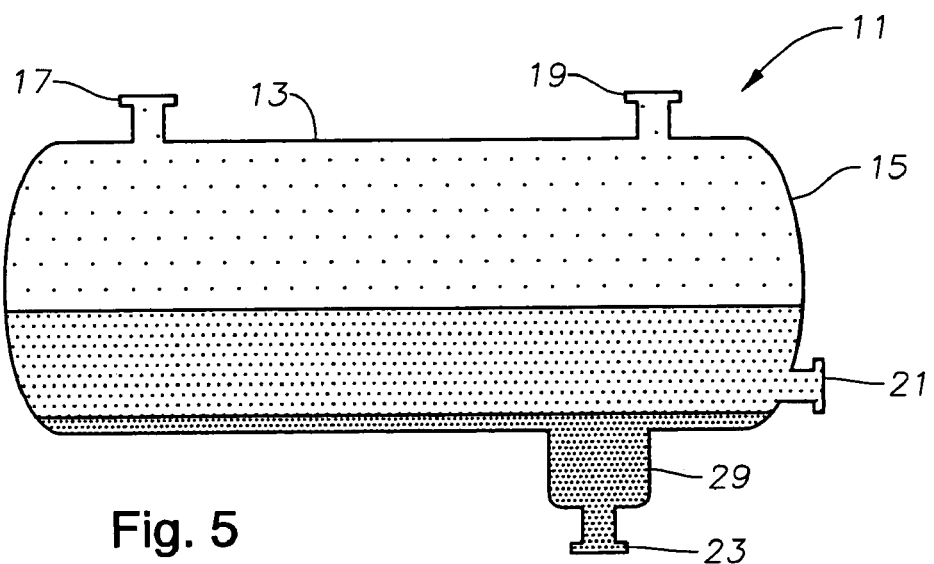
FIG. 5 is a sectional view of a three-phase horizontal separator with a boot assembly designed and sized in accordance with an embodiment of the present invention.

Referring to FIG. 5, separator 11 is another horizontal separator similar to that shown in FIG. 1. Separator 11 in FIG. 5, however, preferably includes a boot 29 extending downward from the lower sidewall of separator body 13. Heavy fluid outlet 23 extends from the lower most portion of boot 29. Heavy liquid separated from the fluids entering separator 11 accumulates within boot 29 before exiting separator 11 through fluid outlet 23. Light liquids separating from the heavy liquid and vapor exit separator 11 through light liquid outlet 21 extending through end cap 15 at an elevation above the heavy liquid fluid level. Vapor exits separator 11 in FIG. 5 through vapor outlet 19 positioned through the upper sidewall of separator body 13.

Figure 6:
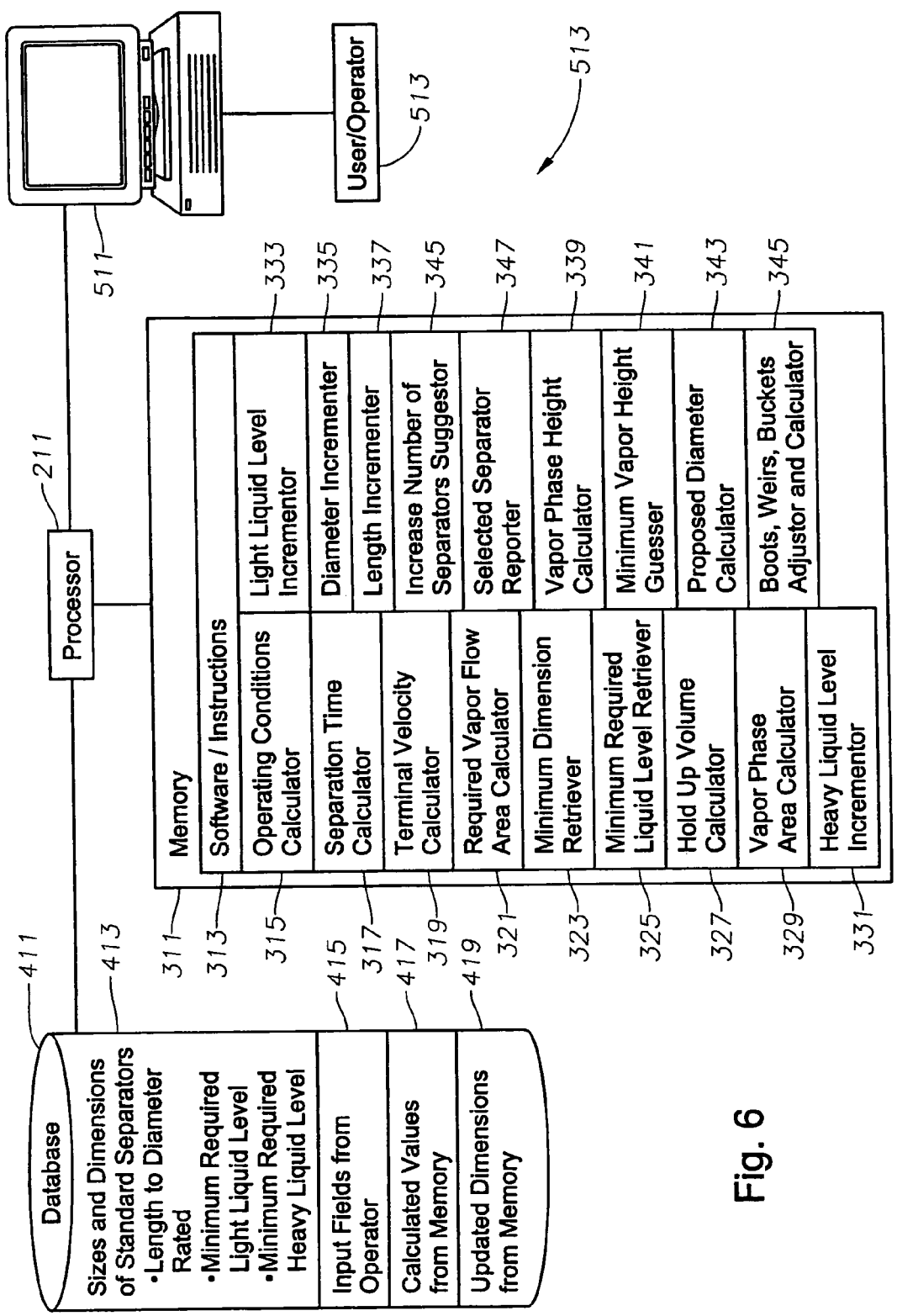
FIG. 6 is a schematic diagram of a separator sizing system and method for sizing separators according to an embodiment of the present invention.

FIG. 6 shows a schematic representation of a separator sizing system 111 designed for selecting the optimum separator size for each of the above described separators 11 shown in FIGS. 1 through 5. Separator sizing system 111 preferably includes a processor 211 in electrical communication with memory 311 and a database 411. Processor 211 is also preferably in electrical communication with a user interface 511 for interaction from a user 513. As shown in FIG. 6, user interface 511 can be a keyboard and monitor assembly for a computer system, however, as will be appreciated by those readily skilled in the art, user interface 511 can be numerous forms of electronic media. For example, a user interface 417 can include, but is not limited to, a mouse attached to a computer, a personal digital assistant (PDA), a cellular telephone with Internet connections, or a touch sensitive screen connected to a computer system having access with a communication network.

In the preferred embodiment, software or instructions 313 are preferably stored within memory 311. Instructions 313 preferably include modules designed to perform specific operations necessary for sizing separators 11. Instructions 313 preferably include an operating conditions or design conditions calculator 315 to calculate preselected operating conditions and design conditions of the fluid entering separator 11. The design conditions calculated by design conditions calculator 315 are responsive to values inputted by user 513 into user interface 511 and communicated through processor 211 to memory 311. Typical design conditions are those that are calculated using basic thermodynamic principles upon entry of such values as specific gravity, density, pressure, and/or temperature of the fluid entering separator 11. As will be readily appreciated by those skilled in the art, entry of other standard values such as molar weight or mass flow rate can readily be substituted for values in order to calculate design conditions of the fluid entering separator 11.

Figure 7:
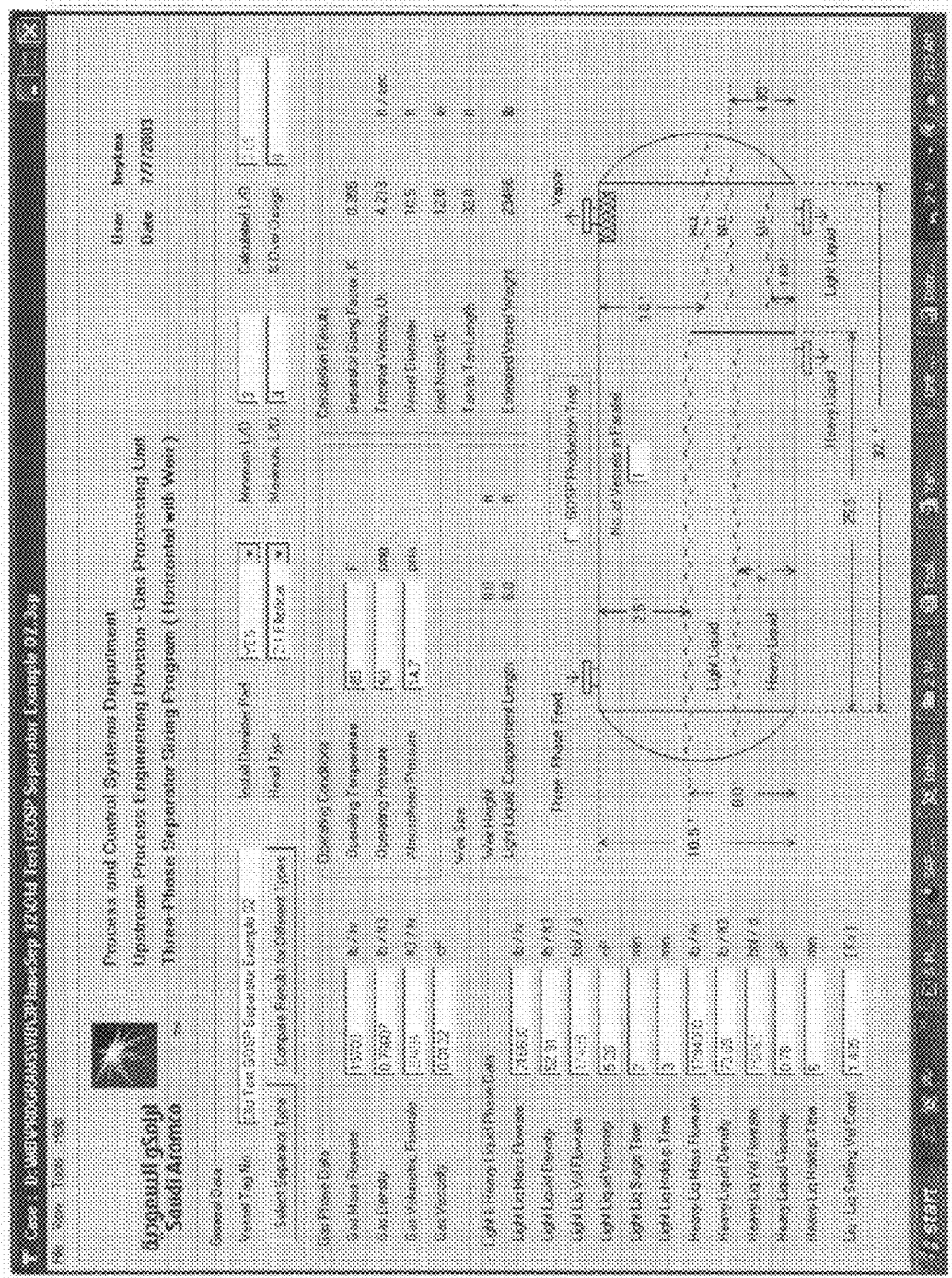
FIG. 7 is a schematic representation of an input screen for an operator to input operating and design conditions into the separator sizing system of FIG. 6 according to an embodiment of the present invention.

The typical values or fields (FIG. 7) that are entered by operator 513 for calculations include gas mass flow rate of vapor entering separator 11 with the fluid as well as the gas density of the vapor, light liquid density and light liquid mass flow rate of the light liquids entering separator 11 with the fluid, and the heavy liquid density and heavy liquid mass flow rate entering separator 11 with the fluids. Additional design conditions for initial calculation purposes include the operating temperature, operating pressure, and atmospheric pressure depending upon the location wear separator 11 would be located.

Referring back to FIG. 6, based upon all these values, various other design conditions can be calculated for example the gas volumetric flow rate, liquid light volume flow rate, liquid light volumetric flow rate, the heavy liquid volumetric flow rate can be calculated by the design conditions calculator 315 responsive to the fields inputted by operator 513. Values produced from design conditions calculator 313 are preferably transferred through processor 211 to database 411 for storage. Other design conditions include a required light liquid surge volume, a required heavy liquid surge volume, a required light liquid holdup volume, and a required heavy liquid holdup volume.

Instructions 313 preferably include a separation type calculator 317 as one of the modules found within instructions 313. Separation time calculator 317 preferably calculates in a manner known in the art the time required for the heavy liquids to separate from the light liquids and the fluid entering separator 11. In order to calculate the time required, separation time calculator 317 must calculate both the settling time of the heavy liquid droplets found within the light liquid region of separator 11 and the rising time required for the light liquid droplets found within the heavy liquid region of separator 11. Both of these values are based upon the principle that over time smaller droplets of the light liquid found within the heavy liquids will eventually rise from the heavy liquid to separate and accumulate with the light liquids found within separator 11. Similarly, the heavy liquid droplets initially located within the light liquid of the fluid will eventually settle and accumulate with the heavy liquid portion of separator 11. The separation time calculator 317 advantageously calculates both the settling and rising time required for both of these processes to occur within separator 11.

Another module found within instructions 313 includes a terminal velocity calculator 319. The terminal velocity calculator calculates in a manner known in the art the terminal velocity of the vapor separating from the light and heavy liquids found within the fluid entering separator 11. As before, the calculated terminal velocity of the vapor is communicated through processor 211 to database 411 for storage. In the preferred embodiment, another module found within instructions 313 is a minimum dimension retriever 323 and a minimum required liquid level retriever 325. Minimum dimension retriever 323 and minimum required liquid level retriever 325 advantageously communicates with database 411 which has stored sizes and dimensions, and physical properties of preselected standard separators within the size and dimensions storage field 413. Minimum dimension retriever 323 is preferably responsive to a minimum length to diameter ratio entered by operator 513 and communicated to memory 311 via processor 211. Minimum retriever 323 preferably retrieves the minimum length and minimum diameter from the size and dimension database field 413 stored within database 411 for preselected separators having a length to diameter ratio equal to the minimum length to diameter ratio inputted by the operator 513. Minimum required liquid level retriever 325 advantageously communicates with database 411 to retrieve the minimum required heavy liquid level and minimum required light liquid level for fluids located within a separator 11 with the minimum length and diameter as previously retrieved from minimum dimension retriever 323.

Another module preferably included within instructions 313 is a holdup volume calculator 327. As is readily appreciated by those skilled in the art, the holdup volume for the heavy liquid and light liquid within the fluid entering separator 11 is the volume of the fluids accumulating before the heavy and light liquids exit separator 11 through their respective liquid outlets 21, 23. Holdup calculator 327 advantageously utilizes standard formulas known in the art for calculating the holdup volume for both the light liquid and the heavy liquid entering and accumulating within separator 11 before exiting through light liquid and heavy liquid outlets 21, 23. Typical holdup volume calculations are dependent upon the design conditions of the fluid entering separator 11 as well as the dimensions of separator 11 as provided from minimum dimension retriever 323. The holdup volumes calculated by holdup calculator 327 are for comparison with the minimum required holdup volumes calculated by design conditions calculator 315.

A vapor phase area calculator 329 is another module preferably included within instructions 313 of memory 311. Vapor phase area calculator 329 calculates the vapor phase area remaining within separator 11 based upon the holdup volumes calculated by holdup volume calculator 327. Therefore, vapor phase area calculator 329 is dependent upon the dimensions of separator 11. In the preferred embodiment, values calculated by vapor phase area calculator 329, holdup volume calculator 327, required vapor flow area calculator 321, terminal velocity calculator 319, separation time calculator 317, and design conditions calculator 315 are communicated through processor 211 to database 411 for storage. Dimensions and liquid levels retrieved with minimum dimension retriever 323, and minimum required liquid level retriever 325 are also preferably communicated through processor 211 to database 411 for storage.

A heavy liquid level incrementor 331 is preferably another module stored on memory 311 as instructions 313. Heavy liquid level incrementor 331 advantageously increases the heavy liquid level used during calculations by holdup volume calculator 327 responsive to preselected conditions. For example, if the calculated heavy liquid holdup volume calculated from holdup volume calculator 327 is less than the minimum required heavy liquid holdup volume calculated by design conditions calculator 315, heavy liquid level incrementor 331 incrementally increases the liquid level of the heavy liquids within separator 11 for further calculations. Another module preferably included within instructions 313 is a light liquid level incrementor 333. Light level incrementor 333 advantageously incrementally increases the minimum light liquid level by a predetermined amount responsive to preselected conditions. For example, light liquid level incrementor 333 incrementally increases the light liquid level used for calculations when the calculated holdup volume of the light liquid within separator 11 calculated by holdup volume calculator 327 is less than the minimum required light liquid holdup volume as calculated by design conditions calculator 315.

Additional modules included within instructions 313 of memory 311 are preferably a diameter incrementor 335 and a length incrementor 337. Length incrementor 337 advantageously increases the length of separator 11 during calculations responsive to predetermined results. For example, length incrementor 337 can increase the length of separator 11 for calculation purposes when the total height of the vapor plus the height of the light liquid level plus the height of the heavy liquid are greater than the diameter of separator 11 as retrieved by minimum dimension retriever 323. Preferably, the total height comparison is performed after satisfying that the calculated holdup volume for the light liquids and the calculated holdup volume for the heavy liquids are greater than the minimum required holdup volumes of the light and heavy liquids. An increase in length by length incrementor 337 advantageously reduces the heights for the vapor, heavy liquid, and light liquid within separator 11 so that the dimension required for the heavy liquid, light liquid, and vapor can be less than the diameter as retrieved by dimension retriever 323 for separator 11. Diameter incrementor 335 advantageously increases the diameter of separator 11 for calculation purposes responsive to predetermined criteria. An example of such predetermined criteria is when the length to diameter ratio of separator 11 following the previous calculations is greater than the length to diameter ratio originally used prior to calculations. Increasing the diameter of separator 11 helps reduce the length to diameter ratio overall for separator 11.

Another module stored within instructions 313 of memory 311 includes the vapor phase height calculator 339, and a minimum vapor height guesser 341. Minimum height vapor guesser 341 advantageously provides an initial guess value for the height of the vapor entering separator 11 before calculations are performed by the other modules within instructions 313 as described above. Minimum vapor height guesser 341 can use numerous parameters for supplying a minimum vapor height guess value. For example, minimum vapor height guesser 341 can provide a guess value for the minimum vapor height based upon a percentage of the overall diameter of separator 11, based upon a preselected value for each predetermined standard separators within database 411 from which dimensions are retrieved by minimum dimension retriever 323, or based upon the ratio of the vapor to the fluid entering separator 11 through fluid inlet 17. Vapor phase height calculator 339 advantageously calculates the vapor phase height of the vapor within the fluid entering separator 11 responsive to the dimensions of separator 11 as well as the rising time and settling time of the heavy and light liquids calculated by separation time calculator 317 and design conditions calculator 315. The vapor phase height calculated by vapor phase height calculator 339 is used in calculating an actual vapor phase area for sensing the viability of separator 11 under the design conditions.

An additional module of instructions 313 stored in memory 311 also includes proposed diameter calculator 343. Proposed diameter calculator 343 advantageously calculates the diameter of separator 11 based upon the height of the vapor, light liquid, and heavy liquid found in the fluid entering separator 11. Proposed diameter calculator 343 advantageously adjusts the calculated diameter of separator 11 responsive to changes in separator length and separator diameter prior to calculating the holdup volumes. An additional mode of instructions 313 stored in memory 311 is boots, weirs, and buckets adjustor and calculator 344. Adjustor and calculator 344 advantageously adjusts the calculations to accommodate the presence of boots, weirs, or buckets internally located in the separator like those shown in FIGS. 1-5.

Database 411 advantageously provides storage fields for various preselected information important for sizing separators 11. Database 411 preferably comprises a size and dimensions field 413. The size and dimensions field 413 preferably stores retrievable information pertaining to the sizes and dimensions of preselected standard separators used in the industry for three phase fluid separation. The sizes and dimensions of standard separators can preferably include the length, the diameter, the length to ratio, the minimum required light liquid level, and the minimum required heavy liquid level of each of the preselected standard separators used within the industry. Database 411 also preferably includes a storage field for input fields from operator 415. As previously described, input fields from operator 415 are used when calculating design conditions by design conditions calculator 315 within memory 311. Input fields from operator field 415 within database 411 advantageously stores the inputted fields from operator 513 for retrieval by design conditions calculator 315 and other calculators within memory 311 for later calculation interations for sizing separator 11.

Another storage field advantageously stored within database 411 preferably includes calculated values from memory 417. Values calculated by various instructions 313 within memory 311 are advantageously communicated through processor 211 to database 411 for storage. Calculated values from memory 311 are stored within calculated values from memory field 417 for reporting to operator 513, or for further calculations upon interations by separator sizing system 111.

Another storage field found within database 411 comprises an updated dimensions from memory field 419 for storing retrievable values for the length and diameter of separator 11 for calculations during interations by separator sizing system 111. Updated dimensions from memory field 419 preferably retrieves information regarding updated separator dimensions from diameter incrementor 335 and length incrementor 337. Based upon updated dimensions from memory field 419, diameter incrementor 335 and length incrementor 337 advantageously increases the length and diameter of separator 11 by increments on top of those incremental steps already added to the length and diameter dimensions of separator 11.

Referring to FIGS. 8A-8D, the process utilized by separator sizing system 111 is shown in the schematic form of sizing diagram 611. In operational step 611, software 313 reads fields and values inputted by operator and stores the values in database 411. As shown in operational step 613, the software 313 then calculates design conditions responsive to the input fields. As described above, the calculations performed in operational step 613 are performed by design conditions calculator 315 of software or instructions 313. In the next operational step 614, software 313 retrieves the minimum separator length and diameter based upon inputted values for the maximum and minimum length to diameter ratios and vessel type. As discussed above, retrieving of the minimum separator length and diameter for separator 211 is based upon the values retrieved by minimum dimension retriever 323 stored within instructions 313 of memory 311.

After retrieving the minimum separator length and diameter values, the next operational step 615 is for the software to assign the minimum separator length and diameter values for calculations. Afterwards in operational step 616, the software 313 assumes a minimum height for the vapor phase of the fluid entering separator 11. As discussed above, the assumption of the minimum height vapor phase is performed by minimum vapor height guesser 341.

After separator sizing system 111 calculates the design conditions responsive to the inputted fields and assigns the dimensions to separator 11 based upon inputted fields, in the next operational step 617, the software 313 retrieves the minimum heavy liquid and light liquid levels based upon separator length, diameter, and separator type. After retrieving the minimum heavy and light liquid levels, in the next operational step 618, the software calculates the holdup volumes for the heavy and light liquids based upon the liquid heights and separator dimensions retrieved during operational step 617, 616, and 615. In operational 619 the software program 311 compares the calculated heavy liquid holdup volume with the minimum required heavy liquid holdup volume based upon the dimensions of separator 11. In operational step 620 the separator sizing system 111 compares the calculated heavy liquid holdup volume with the minimum heavy liquid volume. If the heavy liquid holdup volume as calculated by operational step 618 is not greater than or equal to the minimum required heavy liquid holdup volume, the software sizing system then proceeds to operational step 621. If in operational step 620 the calculator holdup volume is less than the minimum heavy liquid holdup volume then the separator sizing system 111 proceeds to operational step 622.

In operational step 621, after determining that the calculated heavy liquid holdup volume is not greater than or equal to the minimum heavy liquid holdup volume for separator 11, the software 313 increases the minimum heavy liquid height by a predetermined increment. In the preferred embodiment, the incremental steps for software 313 to incrementally increase the minimum heavy liquid height is preferably six inches. After increasing the heavy liquid height by the predetermined increment by software 313 in process step 621, the software program 313 compares separator 11 diameter to the total of the vapor phase height, the heavy liquid level, and the difference of the heavy liquid level from the light liquid level. The difference of the heavy liquid level from the light liquid level is also known as the height of the light liquid within separator 11. In process or decisional step 624, if the total of the vapor phase height, the heavy liquid level, and the difference of the heavy liquid level from the light liquid level is greater than the diameter of separator 11, then the separator sizing system 111 proceeds to letter B which leads to process step 642 (FIG. 8D). If the total of the vapor phase height, the heavy liquid level, and the difference of the heavy liquid level from the light liquid level is less than or equal to the diameter of separator 11, then separator sizing system 111 proceeds to process step 625. In process step 625, software 313 replaces the previous heavy liquid level with an increased heavy liquid level for calculations. After increasing the heavy liquid level with the increased heavy liquid level for calculations, separating sizing system 111 proceeds back to process step 618 for recalculating the holdup volumes for the heavy and light liquid levels based upon the liquid heights and the separator dimensions, while using the new heavy liquid level for such calculations. The separator sizing system then repeats operational steps 619 and 620.

As mentioned above, when the calculated heavy liquid holdup volume is greater than or equal to the minimum required heavy liquid holdup volume as compared in operational step 620, software sizing system 111 then proceeds to operational step 622. In operational step 622, the software program 313 compares the calculated light liquid holdup volume with the minimum required light liquid holdup volume. A calculated holdup volume is provided by holdup volume calculator 327. The minimum required light liquid holdup volume is from field 413 within database 411. The comparison of the calculated light liquid holdup volume and the minimum required light liquid holdup volume is performed within operational step 626. If the calculated light liquid holdup volume is greater than the minimum required light liquid holdup volume, the software program 313 proceeds to letter A which continues on to operational step 631 (FIG. 8C). If the calculated light liquid holdup volume is less than the minimum required light liquid holdup volume then computer software program 313 proceeds to operational step 627.

In operational step 627, software program 313 increases the minimum light liquid height by a predetermined increment. As mentioned above, the predetermined incremental step is a predetermined value as set within software program 313. The typical incremental step utilized by software 313 is an increment of six inches. The incremental increase of minimum light liquid height is performed by light liquid level incrementor 333 of instructions 313 stored within memory 311. After increasing the light liquid level height by the predetermined increment in operational step 627, software program 313 proceeds to operational step 628.

In operational step 628 software program 313 compares the separator diameter to a total of the vapor phase height, the heavy liquid level, and the difference of the heavy liquid level from the light liquid level. Operational step 628 is similar to operational step 623. In operational step 629, if the total of the vapor phase height, the heavy liquid level, and the difference of the heavy liquid level from the light liquid level is greater than the diameter of separator 11, software program 313 proceeds to letter B which is continued on FIG. 8D with proceeding toward operational step 642. If the total of the vapor phase height, the heavy liquid level, and the difference of the heavy liquid level from the light liquid level is not greater than the diameter of separator 11, then this means that the total of the heavy, light, and vapor liquids within separator 11 is capable of being held within the diameter of separator 11. Upon such a finding in operational step 629, software program 313 proceeds to operational step 630, in which software program 313 replaces the previous light liquid level with an increased light liquid level for calculations. After replacing the previous light liquid level as provided by database 411 with the increased light liquid level in operational step 630, software program 313 proceeds back to operational step 618 for calculating holdup volumes for the heavy and light liquid levels based upon the liquid heights and separator dimensions for separator 211. After separator sizing program 111 recalculates the holdup volumes for the heavy and light liquid levels in operational step 618, software program 313 then repeats operational step 619 and 620.

After comparing the calculated heavy liquid holdup volume and the light liquid holdup volumes with the minimum required heavy and light liquid holdup volume in steps 620 and 626, if the calculated holdup volumes for both the light and heavy liquids were greater than the minimum holdup volumes for the heavy and light liquids, software sizing system 111 proceeds to letter A on FIG. 8C which then proceeds to operational step 631 on FIG. 8C. In operational step 631, software program 313 calculates the rising time of the light liquid droplets within the heavy liquid of the fluid within separator 11 based upon separator dimensions and liquid levels. The calculations of the rising time for the light liquid droplets in the heavy liquids are performed by separation time calculator 317. In operational step 632, software program 313 compares the calculated rising time of the light liquid droplets from separation time calculator 317 with a heavy liquid residence time that is inputted by operator 513 and stored within database 411. In operational step 633, if the rising time calculated by separation time calculator 317 is less than or equal to the heavy liquid residence time inputted by the operator 513, separator sizing system 111 proceeds to operational step 634. If the rising time of the light liquid droplets within heavy liquid is greater than the heavy liquid residence time inputted by the operator 513, the separator sizing system 111 proceeds to letter B.

In operational step 634, software program 313 calculates the settling time of the heavy liquid droplets and the light liquid, based upon separator 11 dimensions and the liquid levels within separator 11. The settling time of the heavy liquid droplets and the light liquid is calculated by separation time calculator 317. After calculating the settling time of the heavy liquid droplets, software sizing system 111 proceeds to operational step 635, in which software program 313 compares the calculated settling time of the heavy liquid droplets in the light liquid with the light liquid residence time impeded by the operator 513. In operational step 636, if the settling time of the heavy liquid droplets and the light liquid as calculated by separation time calculator 317 is not less than or equal to the light liquid residence time as inputted by operator 513, then separator sizing system 111 proceeds to letter B on FIG. 8D. If the settling time of the heavy liquid droplets within the light liquid is less than or equal to the light liquid residence time as inputted by operator 513, then separator sizing system 111 proceeds to operational step 637.

In operational step 637, separator program 313 calculates the height of space available for vapor based upon separator 11 dimensions and liquid levels. The calculations performed in operational steps 637 are performed by vapor phase height calculator 339. After calculating the height of space available for the vapor by vapor phase height calculator 339, separator sizing system 111 proceeds to operational step 638. In operational step 638, software program 313 calculates the area for vapor flow based upon the height of space for vapor and separator 11 dimensions. The calculation of the area for vapor flow is calculated by vapor phase area calculator 329 in instructions 313 of memory 311. The calculated area for vapor flow calculated by vapor phase area calculator 329 in operational step 638, is the area available for vapor flow within separator 11.

After separator sizing system 111 calculates the area available for vapor flow with vapor phase area calculator 329 in operational step 638, separator sizing system 111 proceeds to operational step 639. In operational step 639, software program 313 compares the calculated area available for vapor flow (AV) with the minimum required vapor flow area (MinAV). The minimum required vapor flow area is calculated by design conditions calculator 315 and based upon the design conditions inputted by operator 513 and the calculated vapor terminal velocity calculated by terminal velocity calculator 319. Design conditions calculator 315 also calculates the minimum area required for vapor flow within separator 11. If the available vapor flow area of separator 11 calculated by vapor flow area calculator 329 is greater than or equal to the minimum flow area required based upon the design conditions, then separator sizing system 111 proceeds to operational step 641.

In operational step 641, separator 11 can handle the design conditions and requirements for optimal separation of the light liquid, the heavy liquid, and the vapors from the fluid entering separator 11. Accordingly, in operational step 641, software program 313 then prints the results of separation sizing system 111 for review by operator 513. If the calculated area available for vapor flow from vapor phase area calculator 329 is less than the minimum required vapor flow area from design conditions calculator 315, separator sizing system 111 proceeds to operational step 642.

Operational step 642 is also the operational step proceeded to from letter B corresponding to both operational steps 629 and 624 when the total of the vapor phase height, the heavy liquid level, and the difference of the heavy liquid level from the light liquid level was greater than the diameter of separator 11. In operational step 642, software program 313 increases separator 11 length by a predetermined increment. The incremental increase of separator length is performed by length incrementor 337. After increasing the length of separator 11 with length incrementor 337, separator sizing program 111 proceeds to operational step 643.

In operational step 643, software program 313 calculates the length to diameter ratio of separator 11 with the incrementally increased separator length provided by length incrementor 337. After determining the new length to diameter ratio based upon incrementally increased separator length, software sizing system 111 proceeds to operational step 644. In operational step 644, software program 313 compares the length to diameter ratio with the maximum length to diameter ratio inputted by operator 513 and stored in database 411. In operational step 645, if the length to diameter ratio as calculated with the incrementally increased length is greater than the maximum length to diameter ratio inputted by operator 513, separator sizing system proceeds to operational step 647. If the length to diameter ratio calculated using the incrementally increased length of separator 11 is less than or equal to the maximum length to diameter ratio inputted by operator 513 and stored within database 411, separator sizing system 111 proceeds to operational step 646. In operational step 646, software program 313 replaces the previous separator length with the incrementally increased separator length for calculation purposes and proceeds to letter C. Letter C refers back to letter C on FIG. 8A, for the separator sizing system 111 to return to operational step 617. Calculations are then recalculated using the incrementally increased separator length.

As mentioned above, if the length to diameter ratio with the incrementally increased separator length is greater than the maximum length to diameter ratio separator sizing system proceeds to operational step 647. A finding that the length to diameter ratio using incrementally increased separator length is greater than the maximum length to diameter ratio as inputted by operator 517 means that the separator length must be decreased or the separator diameter must be increased in order to remain within the length to diameter ratio boundaries as set by operator 513. In operational step 647, software program 313 increases separator diameter by a predetermined increment in order to alter the length to diameter ratio. The software program 313 increases the separator diameter with diameter incrementor 335 of instructions 313 stored within memory 311. Length incrementor 337 and diameter incrementor 335 preferably increases the length and diameter of separator 11 by six inch increments. However, as will be understood by those skilled in the art, the incremental steps of increasing the length and diameter of separator 11 can be varied as desired. After diameter incrementor 335 increases separator diameter by the predetermined increment, separator sizing system 111 proceeds to operational step 648. In operational step 648, software program 313 compares the maximum diameter of available standard separators in database 411 with the incrementally increased diameter provided by diameter incrementor 335. In operational step 649, if the incrementally increased diameter of separator 11 is greater than the maximum diameter of the standard separators in database 411, separator sizing system proceeds to operational step 651. In separational step 651, software program 313 suggests using more separators 313 in parallel series for operator 513 to review by using a plurality of separators 313 in parallel, the inlet flow rates of the fluid entering separators 11 can be divided amongst several separators thereby decreasing the length and diameter of separator 11 necessary for proper three phase separation.

In operational step 649, if the incrementally increased diameter of separator 11 is less than or equal to the maximum diameter of standard separators provided in database 411, separator sizing system 111 proceeds to operational step 650. In operational step 650, software program 313 replaces the previous separator diameter with the increased separator diameter from diameter incrementor 335 for further calculations. After substituting the previous separator diameter with the incrementally increased separator diameter from diameter incrementor 335, separator system 111 proceeds to letter D of FIG. 8D. Letter D corresponds to letter D found on FIG. 8A which sends separator sizing system 111 back to operational step 615. Separator sizing system 111 substitutes the incrementally increased separator diameter for the diameter used for calculations in the operational steps following operational step 615. Upon returning to operational step 615 another iteration of calculations is performed by separator sizing system 111.

Figure 8A:
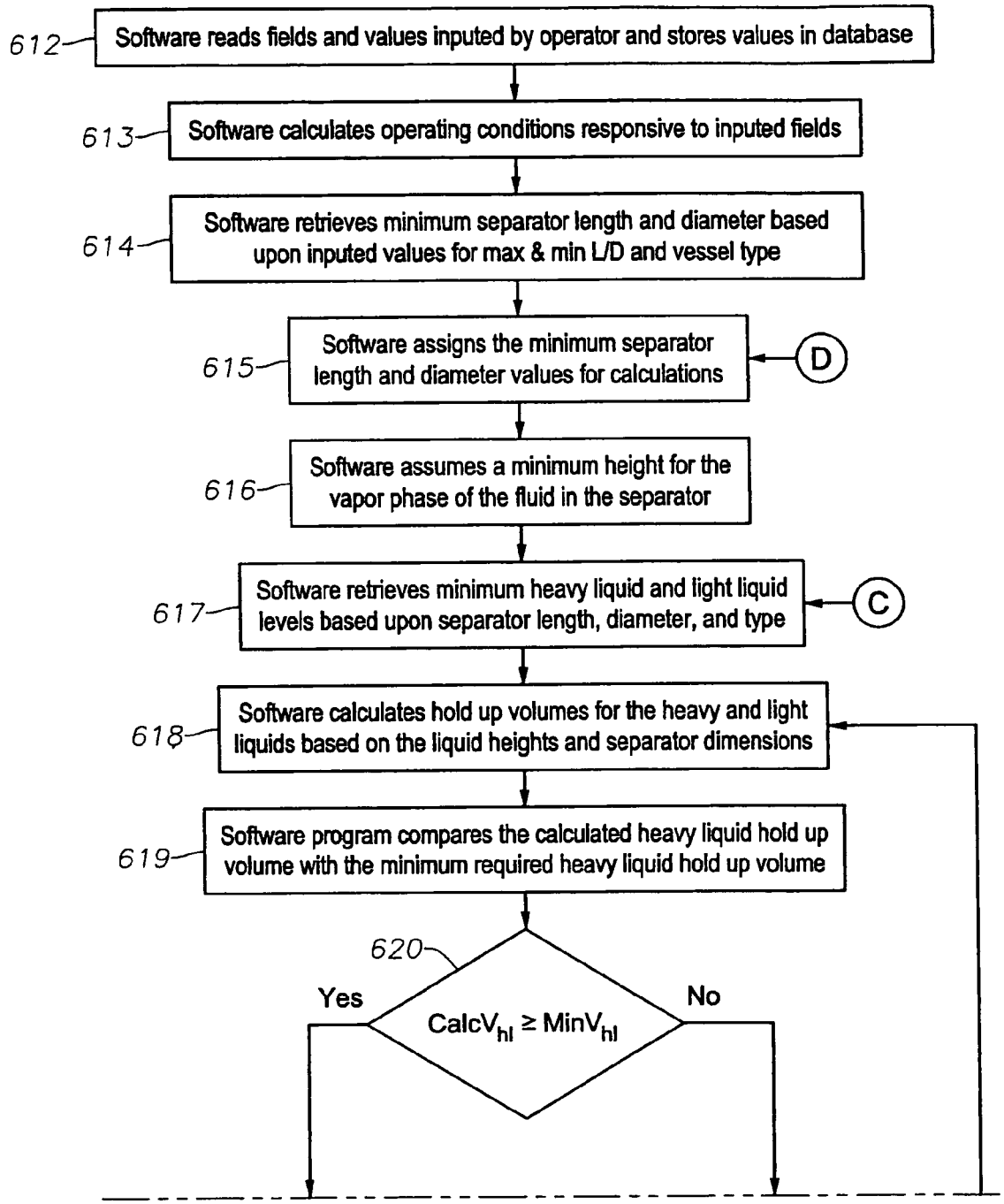
FIG. 8A-8D is schematic flow diagram of the method for sizing the separators shown in FIG. 1 when utilizing the system shown in FIG. 6 according to an embodiment of the present invention.
Figure 8B:
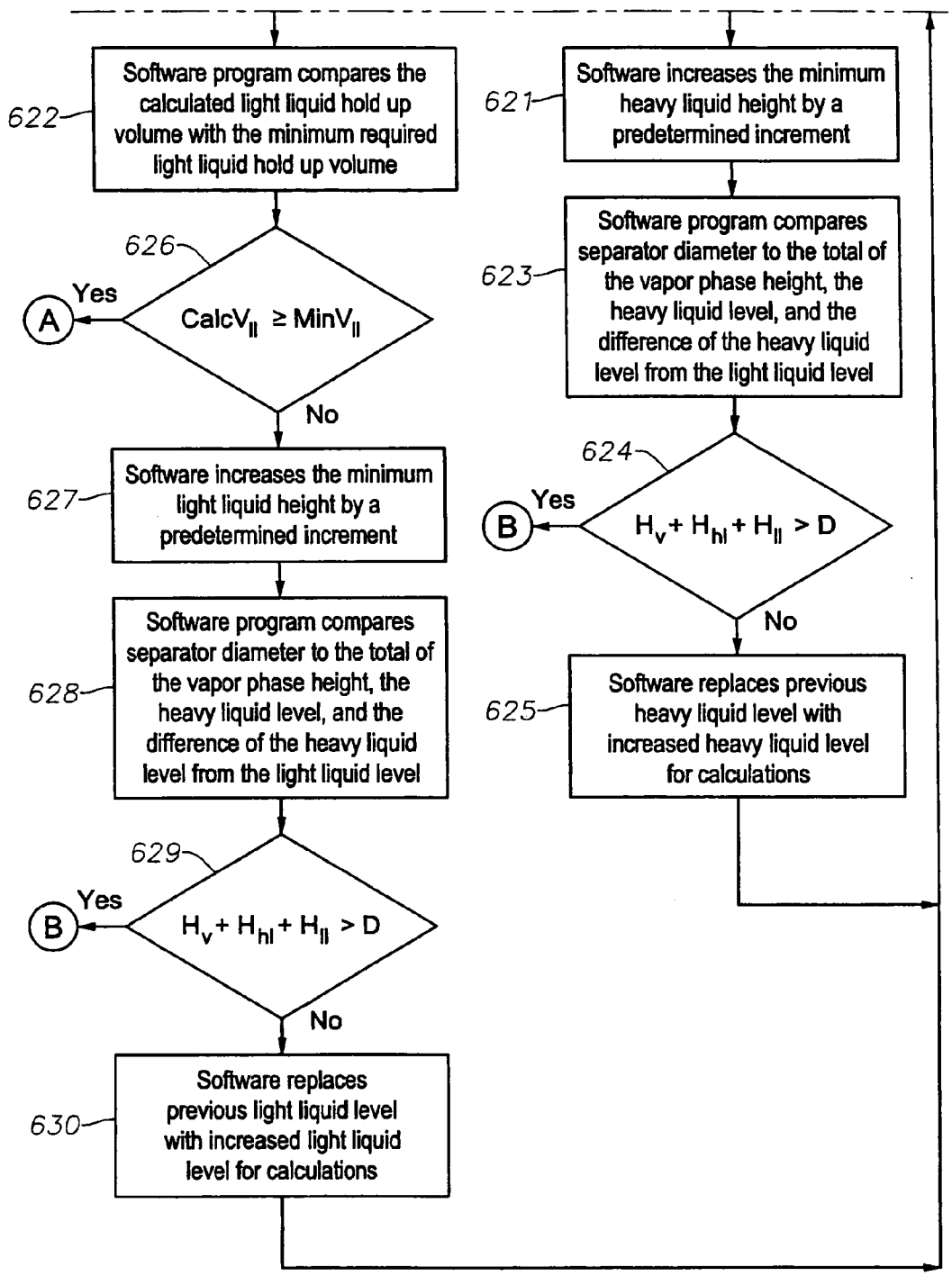
Figure 8C:
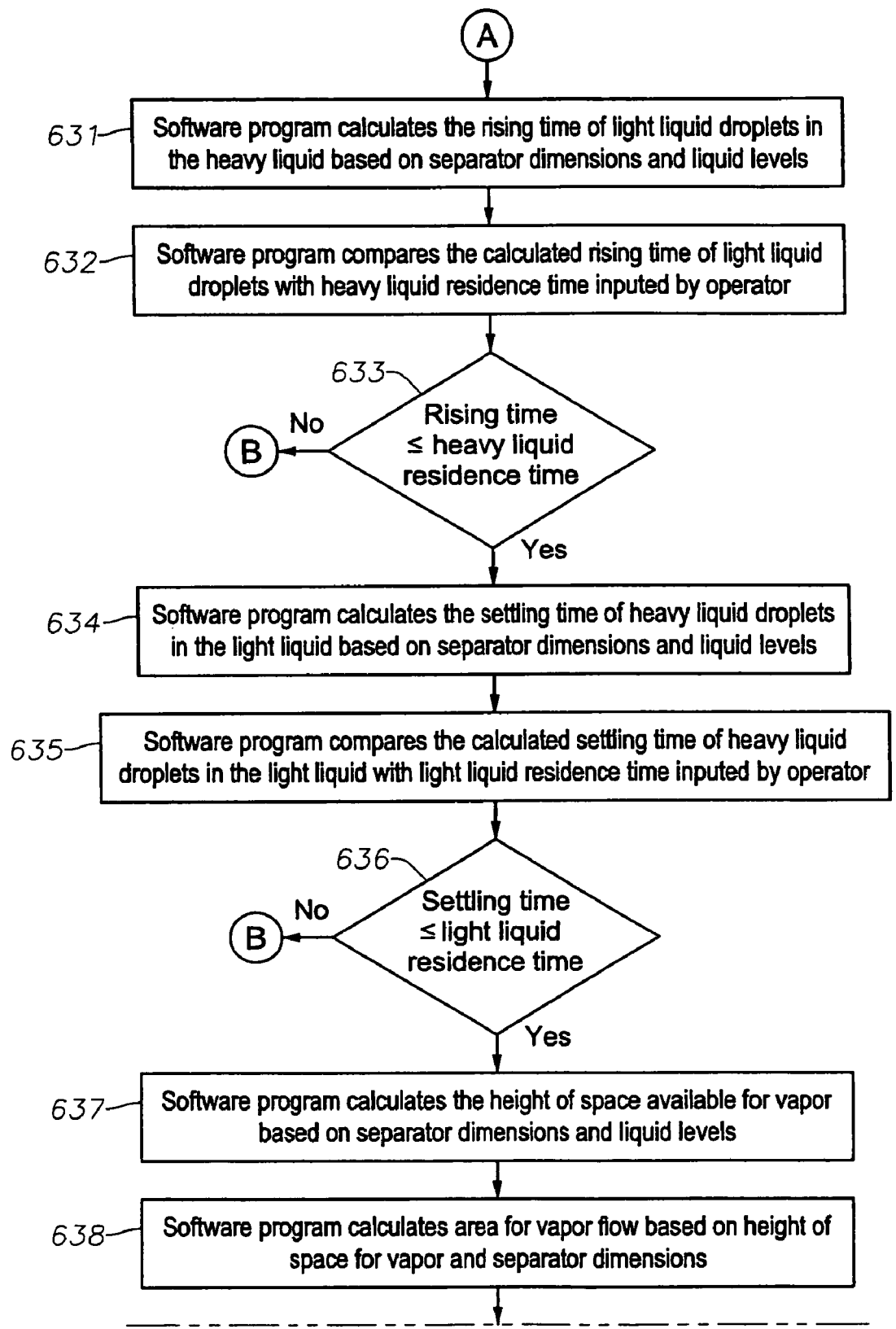
Figure 8D:
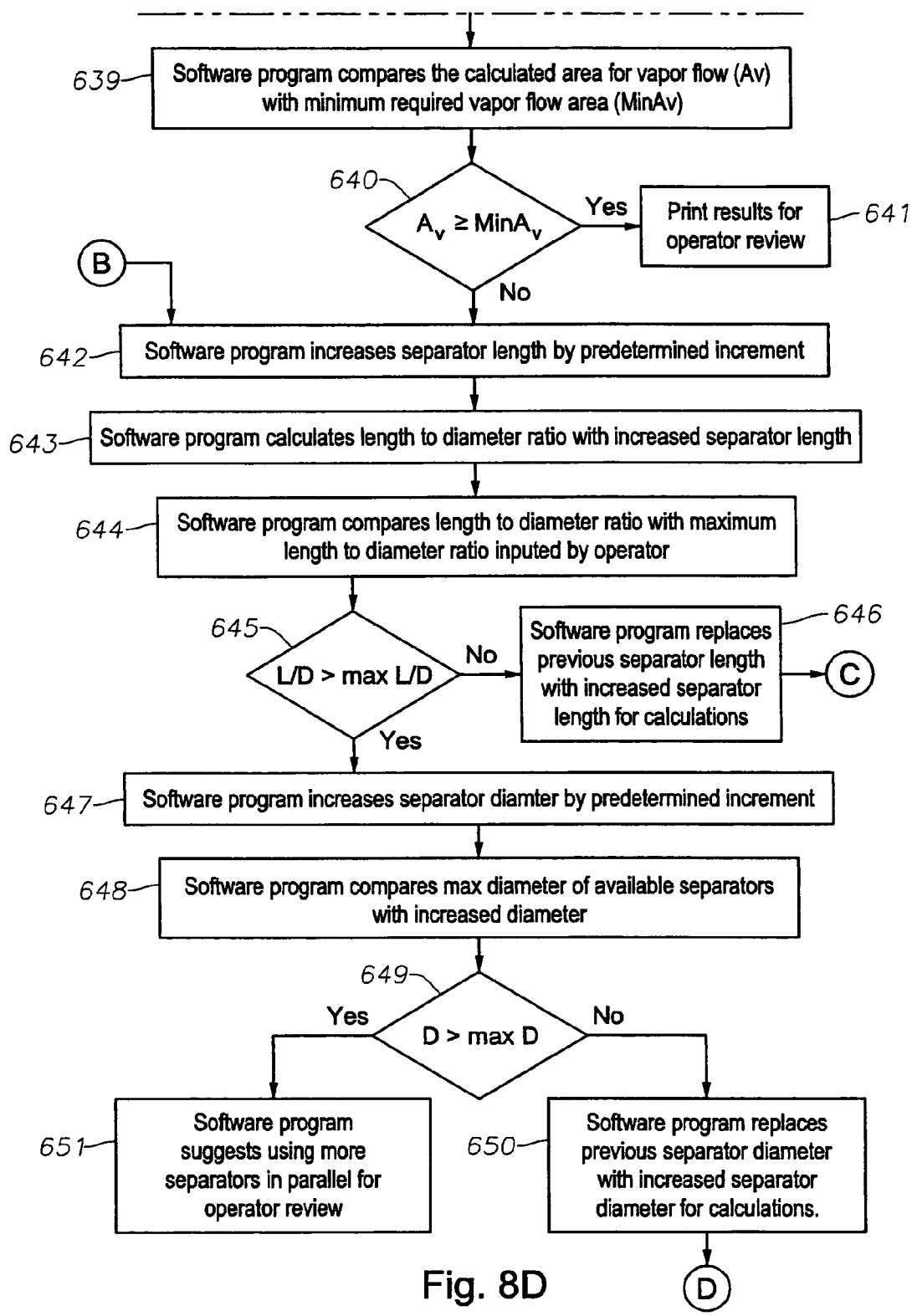
Figure 9A:
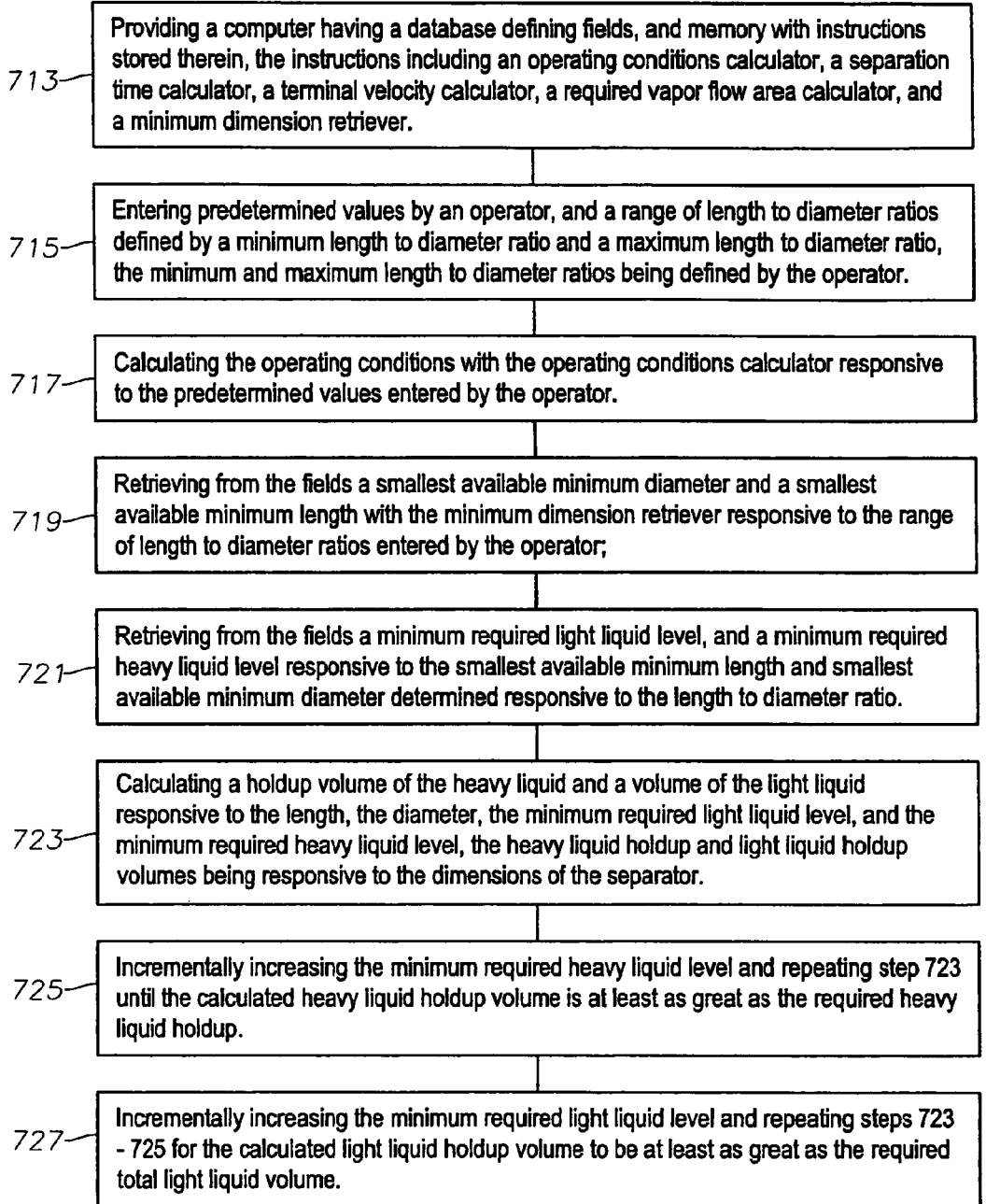
Figure 9B:
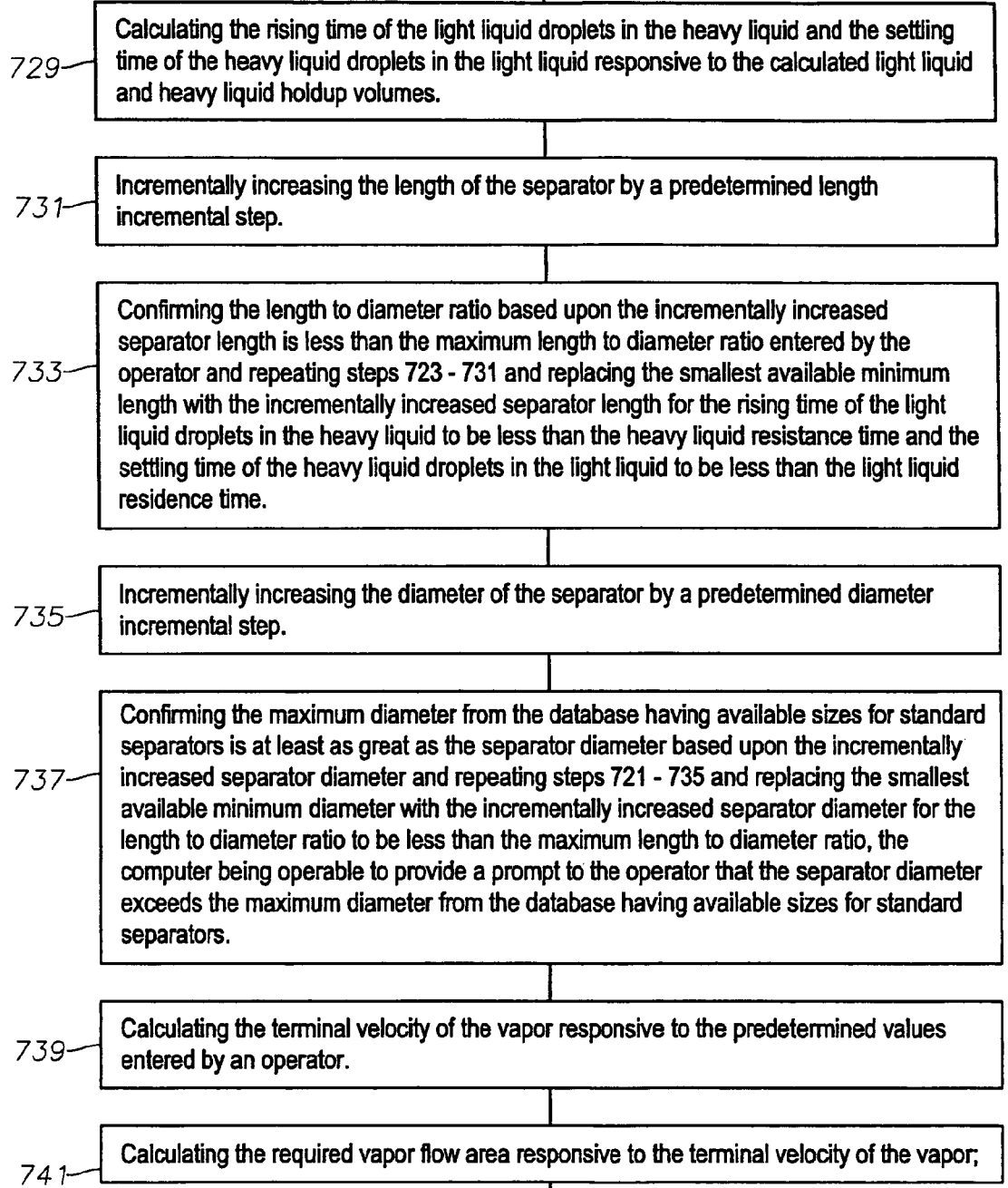

FIGS. 9A-9C show a computerized method 711 of sizing separator 11 with separator sizing system 11, in accordance with the operational steps 611 of FIGS. 8A and 8D. Method step 713 is providing computer 211 having a database 411 defining fields, and memory 311 with instructions 313 stored therein. The instructions 313 including the design conditions calculator 313, the separation time calculator 315, the holdup volume calculator 327, the terminal velocity calculator 319, the required vapor flow area calculator 321, and the minimum dimension retriever 323. At least a portion of the fields containing available preselected sizes for a plurality of predefined standard separators 413, the fields also containing a preselected length to diameter ratio 413, a minimum required light liquid level for a light liquid phase 413, and a minimum required heavy liquid level for a heavy liquid phase associated with each of the preselected sizes for the predefined standard separators 413.

The instructions 311 including an design conditions calculator 315 to calculate preselected design conditions of a fluid entering the predefined standard separator 11 responsive to predetermined values entered by operator 513, a separation time calculator 317 to calculate the rising time of the light liquid droplets in the heavy liquid and the settling time of the heavy liquid droplets in the light liquid responsive to a calculated light liquid holdup volume and a calculated heavy liquid holdup volume that are calculated by the design conditions calculator 313, a terminal velocity calculator 319 to calculate the terminal velocity of the vapor responsive to the predetermined values entered by an operator, a required vapor flow area calculator 321 to calculate the required vapor flow area responsive to the terminal velocity of the vapor, and a minimum dimension retriever 323 that retrieves a smallest available length and a smallest available diameter for a separator from the database responsive to the length to diameter ratios entered by the operator.

Method step 715 is entering the predetermined values by an operator 513, and a range of length to diameter ratios defined by a minimum length to diameter ratio and a maximum length to diameter ratio, the minimum and maximum length to diameter ratios being defined by the operator 513.

Method step 717 is calculating the design conditions with the design conditions calculator 315 responsive to the predetermined values entered by the operator 513. The design conditions including, but not limited to, a required light liquid holdup volume, a required light liquid surge volume, a required heavy liquid holdup volume, a required heavy liquid surge volume, and a required total light liquid volume.

Method step 719 is retrieving from the fields in database 411 the smallest available minimum diameter and the smallest available minimum length with the minimum dimension retriever 323, responsive to the range of length to diameter ratios entered by the operator 513.

Method step 721 is retrieving from the fields in database 411 the minimum required light liquid level, and the minimum required heavy liquid level responsive to the smallest available minimum length and smallest available minimum diameter determined responsive to the length to diameter ratio.

Method step 723 is calculating a volume of the heavy liquid and a volume of the light liquid responsive to the length, the diameter, the minimum required light liquid level, and the minimum required heavy liquid level. The volume of the heavy liquid defining a calculated heavy liquid holdup volume, and the volume of the light liquid defining a calculated light liquid holdup volume. The heavy liquid holdup and light liquid holdup volumes being responsive to the dimensions of the separator. In the preferred embodiment, the heavy liquid holdup and light liquid holdup volumes are calculated with holdup volume calculator 327.

Method step 725 is incrementally increasing the minimum required heavy liquid level and repeating step 723 until the calculated heavy liquid holdup volume is at least as great as the required heavy liquid holdup volume. In the preferred embodiment, method step 725 is performed with heavy liquid level incrementor 331.

Method step 727 is incrementally increasing the minimum required light liquid level and repeating method steps 723-725 for the calculated light liquid holdup volume to be at least as great as the required total light liquid volume. In the preferred embodiment, method step 727 is performed by light liquid level incrementor 333.

Method step 729 is calculating the rising time of the light liquid droplets in the heavy liquid and the settling time of the heavy liquid droplets in the light liquid responsive to the calculated light liquid and heavy liquid holdup volumes. In the preferred embodiment, method step 729 is performed by separation time calculator 315.

Method step 731 is incrementally increasing the length of separator 211 by a predetermined length incremental step. In the preferred embodiment, method step 731 is performed by length incrementor 337.

Method step 733 is confirming the length to diameter ratio based upon the incrementally increased separator length is less than the maximum length to diameter ratio entered by the operator 513. Then repeating steps 723-731 and replacing the smallest available minimum length with the incrementally increased separator length for the rising time of the light liquid droplets in the heavy liquid to be less than the heavy liquid resistance time and the settling time of the heavy liquid droplets in the light liquid to be less than the light liquid residence time.

Method step 735 is incrementally increasing the diameter of separator 211 by a predetermined diameter incremental step. In the preferred embodiment, method step 735 is performed by diameter incrementor 337.

Method step 737 is confirming the maximum diameter from database 411 having available sizes for standard separators is at least as great as the separator diameter based upon the incrementally increased separator diameter. Then repeating steps 721-735 and replacing the smallest available minimum diameter with the incrementally increased separator diameter for the length to diameter ratio to be less than the maximum length to diameter ratio. The computer 211 being operable to provide a prompt to the operator 513 that the separator diameter exceeds the maximum diameter from the database having available sizes for standard separators. In the preferred embodiment, the prompt is provided by increase number of separators suggestor 345.

Method step 739 is calculating the terminal velocity of the vapor responsive to the predetermined values entered by the operator 513. In the preferred embodiment, method step 731 is performed by terminal velocity calculator 319.

Method step 741 is calculating the required vapor flow area responsive to the terminal velocity of the vapor. In the preferred embodiment, method step 731 is performed by length incrementor 337.

Method step 743 is providing a vapor phase height calculator 339 to calculate a calculated vapor phase height responsive to the separator diameter, the heavy liquid level, and the light liquid level. In the preferred embodiment, vapor phase height calculator 339 is included in instructions 313 of memory 311.

Method step 745 is providing a vapor phase area calculator 329 to calculate a calculated vapor phase area responsive to the separator length, the separator diameter, and the calculated vapor phase height. In the preferred embodiment, vapor phase area calculator 329 is also included in instructions 313 of memory 311.

Method step 747 is calculating the calculated vapor phase height with the vapor phase height calculator 339. Method step 749 is calculating the calculated vapor phase area with the vapor phase area calculator 329.

Method step 751 is incrementally increasing the separator length by the predetermined length incremental step. In the preferred embodiment, method step 751 is performed by length incrementor 337.

Method step 753 is to repeat steps 731-751 above for the calculated vapor phase area to be at least as great as the required vapor flow area.

Method step 755 is incrementally increasing the diameter of the separator by a predetermined diameter incremental step. In the preferred embodiment, method step 751 is performed by diameter incrementor 335.

Method step 757 is confirming the maximum diameter from the database 411 having available sizes for standard separators is at least as great as the separator diameter based upon the incrementally increased separator diameter. Then repeating steps 721-755 and replacing the smallest available minimum diameter with the incrementally increased separator diameter for the length to diameter ratio to be less than the maximum length to diameter ratio. The computer 211 being operable to provide a prompt to the operator 513 that the separator diameter exceeds the maximum diameter from the database having available sizes for standard separators. In the preferred embodiment, the prompt is provided by increase number of separators suggestor 345.

Method step 759 is reporting the length and diameter of the separator 211. In the preferred embodiment, method step 759 is reported through the computer or processor 211 and user interface 511 to the operator 513.

Although embodiments of the present invention have been described in the context of a fully functional method, system, and program product of the present invention and/or aspects thereof re capable of being distributed in the form of computer readable medium, media, or means of instructions in a variety of forms for execution on one or more processors such as used in association with various types of computers, including, but not limited to, laptops, personal digital assistants, server computers, administration computers, and various other hardware, software, and/or firmware as understood by those skilled in the art. Also, these embodiments of the present invention can also apply regardless of the particular type of signal bearing media or means used to actually carry out the processing, distributing, or dosing as described herein. Examples of computer readable media or means include: nonvolatile, hard-coded type media such as read only memories (RAMs), erasable, electronically programmable read only memories (EEPROMs), including nonvolatile types, recordable and writable media such as CDs, DVDs, floppy disks, hard drives, and transmission type media such as digital and analog communication links.

Those skilled in the art will recognize that many changes and modifications may be made to the system and method of practicing the separator sizing system 111 without departing the scope and spirit of the invention. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

I claim:

1. A computerized method of sizing a three-phase separator comprising the steps of:
   (a) providing a computer having a database defining fields, at least a portion of the fields containing available preselected sizes for a plurality of predefined separators, the fields also containing a preselected length to diameter ratio, a minimum required light liquid level for a light liquid phase, and a minimum required heavy liquid level for a heavy liquid phase associated with each of the preselected sizes for the predefined separators, the computer also having memory with instructions stored therein, the instructions including a design conditions calculator to calculate preselected design conditions related to a fluid entering the predefined separator responsive to predetermined values entered by an operator, a separation time calculator to calculate rising time of the light liquid droplets in the heavy liquid and settling time of the heavy liquid droplets in the light liquid responsive to a calculated light liquid holdup volume and a calculated heavy liquid holdup volume that are calculated by a holdup volume calculator, a terminal velocity calculator to calculate the terminal velocity of the vapor responsive to the predetermined values entered by an operator, a required vapor flow area calculator to calculate the required vapor flow area responsive to the terminal velocity of the vapor, and a minimum dimension retriever that retrieves a smallest available length and a smallest available diameter for a separator from the database responsive to length to diameter ratios entered by the operator;
   (b) entering the predetermined values by an operator, and a range of length to diameter ratios defined by a minimum length to diameter ratio and a maximum length to diameter ratio, the minimum and maximum length to diameter ratios being defined by the operator;
   (c) calculating the design conditions with the design conditions calculator responsive to the predetermined values entered by the operator, the design conditions including a required light liquid holdup volume, a required light liquid surge volume, a required heavy liquid holdup volume, a required heavy liquid surge volume, and a required total light liquid volume;
   (d) retrieving from the fields the smallest available minimum diameter and the smallest available minimum length with the minimum dimension retriever responsive to the range of length to diameter ratios entered by the operator;

(e) retrieving from the fields the minimum required light liquid level, and the minimum required heavy liquid level responsive to the smallest available minimum length and smallest available minimum diameter determined responsive to the length to diameter ratios;

(f) calculating a volume of the heavy liquid and a volume of the light liquid responsive to the length, the diameter, the minimum required light liquid level, and the minimum required heavy liquid level, the volume of the heavy liquid defining a calculated heavy liquid holdup volume and the volume of the light liquid defining a calculated light liquid holdup volume, the heavy liquid holdup and light liquid holdup volumes being responsive to the dimensions of the separator;

(g) incrementally increasing the minimum required heavy liquid level and repeating step (f) until the calculated heavy liquid holdup volume is at least as great as the required heavy liquid holdup volume;

(h) incrementally increasing the minimum required light liquid level and repeating steps (f)-(g) for the calculated light liquid holdup volume to be at least as great as the required total light liquid volume;

(i) calculating the rising time of the light liquid droplets in the heavy liquid and the settling time of the heavy liquid droplets in the light liquid responsive to the calculated light liquid and heavy liquid holdup volumes;

(j) incrementally increasing the length of the separator by a predetermined length incremental step;

(k) confirming an associated length to diameter ratio based upon the incrementally increased separator length is less than the maximum length to diameter ratio entered by the operator and repeating steps (f)-(j) and replacing the smallest available minimum length with the incrementally increased separator length for the rising time of the light liquid droplets in the heavy liquid to be less than heavy liquid resistance time and the settling time of the heavy liquid droplets in the light liquid to be less than the light liquid residence time;

(l) incrementally increasing the diameter of the separator by a predetermined diameter incremental step;

(m) confirming the maximum diameter from the database having available sizes for separators is at least as great as the separator diameter based upon the incrementally increased separator diameter and repeating steps (e)-(l) and replacing the smallest available minimum diameter with the incrementally increased separator diameter for the length to diameter ratio to be less than the maximum length to diameter ratio, the computer being operable to provide a prompt to the operator that the separator diameter exceeds the maximum diameter from the database having available sizes for separators;

(n) calculating the terminal velocity of the vapor responsive to the predetermined values entered by the operator;

(o) calculating the required vapor flow area responsive to the terminal velocity of the vapor;

(p) providing a vapor phase height calculator to calculate a calculated vapor phase height responsive to the separator diameter, the heavy liquid level, and the light liquid level;

(q) providing a vapor phase area calculator to calculate a calculated vapor phase area responsive to the separator length, the separator diameter, and the calculated vapor phase height;

(r) calculating the calculated vapor phase height with the vapor phase height calculator;

(s) calculating the calculated vapor phase area with the vapor phase area calculator;

(t) incrementally increasing the separator length by the predetermined length incremental step;

(u) repeat steps (j)-(t) above for the calculated vapor phase area to be at least as great as the required vapor flow area;

(v) incrementally increasing the diameter of the separator by a predetermined diameter incremental step;

(w) confirming the maximum diameter from the database having available sizes for separators is at least as great as the separator diameter based upon the incrementally increased separator diameter and repeating steps (e)-(v) and replacing the smallest available minimum diameter with the incrementally increased separator diameter for the length to diameter ratio to be less than the maximum length to diameter ratio, the computer being operable to provide a prompt to the operator that the separator diameter exceeds the maximum diameter from the database having available sizes for separators; and (x) reporting the length and diameter of the separator.

2. The computerized method of claim 1, wherein the separator length is increased by incremental steps of six-inch increments, after beginning with an increase of zero inches.

3. The computerized method of claim 1, wherein the separator diameter is increased by incremental steps of six-inch increments, beginning with an increase, of zero inches.

4. The computerized method of claim 1, wherein:
the separator length is increased by incremental steps of six-inch increments, after beginning with an increase of zero inches; and
the separator diameter is increased by incremental steps of six-inch increments, after beginning with an increase of zero inches.

5. The computerized method of claim 1, further comprising assigning a minimum vapor height guess value before step (g), wherein the minimum vapor height guess value is a predetermined value that is less than the smallest available minimum diameter of each separator size and wherein a total of the minimum vapor height guess value, the minimum required light liquid level minus the minimum required heavy liquid level, and the minimum required heavy liquid level does not exceed the smallest available minimum diameter.

6. The computerized method of claim 1, wherein step (g) further comprises:
(i) incrementally increasing the minimum requited heavy liquid level for the calculated heavy liquid holdup volume to be at least as great as the required heavy liquid holdup, unless the total of the minimum vapor height guess value, the minimum required light liquid level minus the minimum required heavy liquid level, and the minimum required heavy liquid level is greater than the smallest available minimum diameter; then
(ii) incrementally increasing the length of the separator by a predetermined length incremental step; and
(iii) confirming the length to diameter ratio based upon the incrementally increased separator length is less than the maximum length to diameter ratio entered by the operator and repeating steps (f)-(g) and replacing the smallest available minimum length with the incrementally increased separator length for the smallest available minimum diameter to be at least as great as the total of the minimum vapor height guess value, the minimum required light liquid level minus the minimum required heavy liquid level, and the minimum required heavy liquid level.

7. The computerized method of claim 6, wherein step (h) further comprises:
   (i) incrementally increasing the minimum required light liquid level for the calculated light liquid holdup volume to be at least as great as the required total light liquid volume, unless the total of the minimum vapor height guess value, the minimum required light liquid level minus the minimum required heavy liquid level, and the minimum required heavy liquid level is greater than the smallest available minimum diameter; then
   (ii) incrementally increasing the length of the separator by the predetermined length incremental step; and
   (iii) confirming the length to diameter ratio based upon the incrementally increased separator length is less than the maximum length to diameter ratio entered by the operator and repeating steps (f)-(h) and replacing the smallest available minimum length with the incrementally increased separator length for the smallest available minimum diameter to be at least as great as the total of the minimum vapor height guess value, the minimum required light liquid level minus the minimum required heavy liquid level, and the minimum required heavy liquid level.

8. The computerized method of claim 7, wherein:
step (g) further comprises:
   (1) incrementally increasing the diameter of the separator by the predetermined diameter incremental step; and
   (2) confirming the maximum diameter from the database having available sizes for separators is at least as great as, the separator diameter based upon the incrementally increased separator diameter and repeating steps (e)-(g) and replacing the smallest available minimum diameter with the incrementally increased separator diameter for the length to diameter ratio to be less than the maximum length to diameter ratio, the computer being operable to prompt the operator to use additional separators in parallel with the flowrate into each separator being divided by the total number of separators in parallel should the separator diameter exceed the maximum diameter from the database having available sizes for separators; and
wherein step (h) further comprises:
   (1) incrementally increasing the diameter of the separator by the predetermined diameter incremental step; and
   (2) confirming the maximum diameter from the database having available sizes for separators is at least as great as the separator diameter based upon the incrementally increased separator diameter and repeating steps (e)-(h) and replacing the smallest available minimum diameter with the incrementally increased separator diameter for the length to diameter ratio to be less than the maximum length to diameter ratio, the computer being operable to prompt the operator to use additional separators in parallel with the flowrate into each separator being divided by the total number of separators in parallel should the separator diameter exceed the maximum diameter from the database having available sizes for separators.

9. The computerized method of claim 6, wherein step (g) further comprises:
   incrementally increasing the diameter of the separator by the predetermined diameter incremental step; and
   confirming the maximum diameter from the database having available sizes for separators is at least as great as the separator diameter based upon the, incrementally increased separator diameter and repeating: steps (e)-(g) and replacing the smallest available minimum diameter with the incrementally increased separator diameter for the length to diameter ratio to be less than the maximum length to diameter ratio, the computer being operable to prompt the operator to use additional separators in parallel with the flowrate into each separator being divided by the total number of separators in parallel should the separator diameter exceed the maximum diameter from the database having available sizes for separators.

10. The computerized method of claim 1, wherein step (h) further comprises:
   (i) incrementally increasing the minimum required light liquid level for the calculated light liquid holdup volume to be at least as great as the required total light liquid volume, unless the total of the minimum vapor height guess value, the minimum required light liquid level minus the minimum required heavy liquid level, and the minimum required heavy liquid level is greater than the smallest available minimum diameter; then
   (ii) incrementally increasing the length of the separator by a predetermined length incremental step; and
   (iii) confirming the length to diameter ratio based upon the incrementally increased separator length is less than the maximum length to diameter ratio entered by the operator and repeating steps (f)-(h) and replacing the smallest available minimum length, with the incrementally increased separator length for the smallest available minimum diameter to be at least as great as the total of the minimum vapor height guess value, the minimum required light liquid level minus the minimum required heavy liquid level, and the minimum required heavy liquid level.

11. The computerized method of claim 10, wherein step (h) further comprises:
   incrementally increasing the diameter of the separator by the predetermined diameter incremental step; and
   confirming the maximum diameter from the database having available sizes for separators is at least as great as the separator diameter based upon the incrementally increased separator diameter and repeating steps (e)-(h) and replacing the smallest available minimum diameter with the incrementally increased separator diameter for the length to diameter ratio to be less than the maximum length to diameter ratio, the computer being operable to prompt the operator to use additional separators in parallel with the flowrate into each separator being divided by the total number of separators in parallel should the separator diameter exceed the maximum diameter from the database having available sizes for separators.

12. A computerized method of sizing a three-phase separator comprising the steps of:
   (a) providing a computer having a database defining fields, at least a portion of the fields containing available preselected sizes for a plurality of predefined separators, the fields also containing a preselected length to diameter ratio, a minimum required light liquid level for a light liquid phase, and a minimum required heavy liquid level for a heavy liquid phase associated with each of the preselected sizes for the predefined separators, the computer also having memory with instructions stored therein, the instructions including a design conditions calculator to calculate preselected design conditions related to a fluid entering the predefined separator responsive to predetermined values entered by an operator, a separation time calculator to calculate rising time of the light liquid droplets in the heavy liquid and settling time of the heavy liquid droplets in the light liquid responsive to a calculated light liquid holdup volume and a calculated heavy liquid holdup volume that are calculated by the a holdup volume calculator, a terminal velocity calculator to calculate the terminal velocity of the vapor responsive to the predetermined values entered by an operator, a required vapor flow area calculator to calculate the required vapor flow area responsive to the terminal velocity of the vapor, a minimum dimension retriever that retrieves a smallest available length and a smallest available diameter for a separator from the database responsive to length to diameter ratios entered by the operator, and a minimum required liquid level retriever that retrieves the minimum required light liquid level and the minimum required heavy liquid level responsive to the smallest available minimum length and smallest available minimum diameter determined responsive to the length to diameter ratios;

(b) entering the predetermined values by an operator, and a range of length to diameter ratios defined by a minimum length to diameter ratio and a maximum length to diameter ratio, the minimum and maximum length to diameter ratios being defined by the operator;

(c) calculating the design conditions with the design conditions calculator responsive to the predetermined values entered by the operator, the design conditions including a required light liquid holdup volume, a required light liquid surge volume, a required heavy liquid holdup volume, a required heavy liquid surge volume, and a required total light liquid volume;

(d) retrieving from the fields the smallest available minimum diameter and the smallest available minimum length with the minimum dimension retriever responsive to the range of length to diameter ratios entered by the operator;

(e) retrieving from the fields the minimum required light liquid level, and the minimum required heavy liquid level with the minimum required liquid level retriever responsive to the smallest available minimum length and smallest available minimum diameter determined responsive to the length to diameter ratios;

(f) assigning a minimum vapor height guess value that is a predetermined value less than the smallest available minimum diameter of each separator size, and a total of the minimum vapor height guess value, the minimum required light liquid level minus the minimum required heavy liquid level, and the minimum required heavy liquid level does not exceed the smallest available minimum diameter;

(g) calculating a volume of the heavy liquid and a volume of the light liquid responsive to the length, the diameter, the minimum required light liquid level, and the minimum required heavy liquid level, the volume of the heavy liquid defining a calculated heavy liquid holdup volume and the volume of the light liquid defining a calculated light liquid holdup volume, the heavy liquid holdup and light liquid holdup volumes being responsive to the dimensions of the separator;

(h) incrementally increasing the minimum required heavy liquid level and repeating step (g) for the calculated heavy liquid holdup volume to be at least as great as the required heavy liquid holdup volume;

(i) incrementally increasing the minimum required light liquid level and repeating steps (g)-(h) for the calculated light liquid holdup volume to be at least as great as the required total light liquid volume;

(j) calculating the rising time of the light liquid droplets in the heavy liquid and the settling time of the heavy liquid droplets in the light liquid responsive to the calculated light liquid and heavy liquid holdup volumes;

(k) incrementally increasing the length of the separator by a predetermined length incremental step;

(l) confirming an associated length to diameter ratio based upon the incrementally increased separator length is less than the maximum length to diameter ratio entered by the operator and repeating steps (g)-(k) and replacing the smallest available minimum length with the incrementally increased separator length for the rising time of the light liquid droplets in the heavy liquid to be less than heavy liquid resistance time and the settling time of the heavy liquid droplets in the light liquid to be less than the light liquid residence time;

(m) incrementally increasing the diameter of the separator by a predetermined diameter incremental step;

(n) confirming the maximum diameter from the database having available sizes for separators is at least as great as the separator diameter based upon the incrementally increased separator diameter and repeating steps (e)-(m) and replacing the smallest available minimum diameter with the incrementally increased separator diameter for the length to diameter ratio to be less than the maximum length to diameter ratio, the computer being operable to provide a prompt to the operator that the separator diameter exceeds the maximum diameter from the database having available sizes for separators;

(o) calculating the terminal velocity of the vapor responsive to the predetermined values entered by the operator;

(p) calculating the required vapor flow area responsive to the terminal velocity of the vapor;

(q) providing a vapor phase height calculator to calculate a calculated vapor phase height responsive, to the separator diameter, the heavy liquid level, and the light liquid level;

(r) providing a vapor phase area calculator to calculate a calculated vapor phase area responsive to the separator length, the separator diameter, and the calculated vapor phase height;

(s) calculating the calculated vapor phase height with the vapor phase height calculator;

(t) calculating the calculated vapor phase area with the vapor phase area calculator;

(u) incrementally increasing the separator length by the predetermined length incremental step;

(v) repeat steps (k)-(u) above for the calculated vapor phase area to be at least as great as the required vapor flow area;

(w) incrementally increasing the diameter of the separator by a predetermined diameter incremental step;

(x) confirming the maximum diameter from the database having available sizes for separators is at least as great as the separator diameter based upon the incrementally increased separator diameter and repeating steps (e)-(w) and replacing the smallest available minimum diameter with the incrementally increased separator diameter the length to diameter ratio to be less than the maximum length to diameter ratio, the computer being operable to provide a prompt to the operator that the separator diameter exceeds the maximum diameter from the database having available sizes for separators; and (y) reporting the length and diameter of the separator.

13. The computerized method of claim 12, wherein the separator length is increased by incremental steps of six-inch increments, beginning with an increase of zero inches.

14. The computerized method of claim 12, wherein the separator diameter is increased: by incremental steps of six-inch increments, beginning with an increase of zero inches.

15. The computerized method of claim 12, wherein:
the separator length is increased by incremental steps of six-inch increments, beginning with an increase of zero inches; and
the separator diameter is increased by incremental steps of six-inch increments, beginning with an increase of zero inches.

16. The computerized method of claim 12, wherein:
step (h) further comprises:
(1) incrementally increasing the minimum required heavy liquid level for the calculated heavy liquid holdup volume to be at least as great as the required heavy liquid holdup, unless the total of the minimum vapor height guess value, the minimum required light liquid level minus the minimum required heavy liquid level, and the minimum required heavy liquid level is greater than the smallest available minimum diameter; then
(2) incrementally increasing the length of the separator by a predetermined length incremental step; and
(3) confirming the length to diameter ratio based upon the incrementally increased separator length is less than the maximum length to diameter ratio entered by the operator and repeating steps (g)-(h) and replacing the smallest available minimum length with the incrementally increased separator length for the smallest available minimum diameter to be at least as great as the total of the minimum vapor height guess value, the minimum required light liquid level minus the minimum required heavy liquid level, and the minimum required heavy liquid level; and
step (i) further comprises;
(1) incrementally increasing the minimum required light liquid level for the calculated light liquid holdup volume to be at least as great as the required total light liquid volume, unless the total of the minimum vapor height guess value, the minimum required light liquid level minus the minimum required heavy liquid level, and the minimum required heavy liquid level is greater than the smallest available minimum diameter; then
(2) incrementally increasing the length of the separator by the predetermined length incremental step; and
(3) confirming the length to diameter ratio based upon the incrementally increased separator length is less than the maximum length to diameter ratio entered by the operator and repeating steps (g)-(i) and replacing the smallest available minimum length with the incrementally increased separator length for the smallest available minimum diameter to be at least as great as the total of the minimum vapor height guess value, the minimum required light liquid level minus the minimum required heavy liquid level, and the minimum required heavy liquid level.

17. The computerized method of claim 16, wherein step (g) further comprises:
step (h) further comprises:
a. incrementally increasing the diameter of the separator by the predetermined diameter incremental step; and
b. confirming the maximum diameter from the database having available sizes for separators is at least as great as the separator diameter based upon the incrementally increased separator diameter and repeating steps (e)-(g) and replacing the smallest available minimum diameter with the incrementally increased separator diameter for the length to diameter ratio to be less than the maximum length to diameter ratio, the computer being operable to prompt the operator to use additional separators in parallel with the flowrate into each separator being divided by the total number of separators in parallel should the separator diameter exceed the maximum diameter from the database having available sizes for separators; and
wherein step (i) further comprises:
a. incrementally increasing the diameter of the separator by the predetermined diameter incremental step; and
b. confirming the maximum diameter from the database having available sizes for separators is at least as great as the separator diameter based upon the incrementally increased separator diameter and repeating steps (e)-(h) and replacing the smallest available minimum diameter with the incrementally increased separator diameter for the length to diameter ratio to be less than the maximum length to diameter ratio, the computer being operable to prompt the operator to use additional separators in parallel with the flowrate into each separator being divided by the total number of separators in parallel should the separator diameter exceed the maximum diameter from the database having available sizes for separators.

18. Software to size a three-phase separator, stored on a non-transitory computer readable medium, the software comprising:
a design conditions calculator to calculate preselected design conditions related to a fluid entering a three-phase separator responsive to predetermined values entered by an operator;
a separation time calculator to calculate rising time of a plurality of light liquid droplets in a heavy liquid in the fluid entering the three-phase separator and settling time of a plurality of heavy liquid droplets in a light liquid in the fluid entering the three-phase separator responsive to a calculated light liquid holdup volume and a calculated heavy liquid holdup volume that are calculated by the design conditions calculator;
a terminal velocity calculator to calculate the terminal velocity of a vapor in the fluid entering the three-phase separator responsive to the predetermined values entered by the operator;
a required vapor flow area calculator to calculate the required vapor flow area responsive to the terminal velocity of the vapor;
a minimum dimension retriever to retrieve a smallest available length and a smallest available diameter for a separator from the database responsive to length to diameter ratios entered by the operator;
a minimum required liquid level retriever to retrieve a minimum required light liquid level and a minimum required heavy liquid level responsive to the smallest available minimum length and smallest available minimum diameter determined responsive to the length to diameter ratios;
a holdup volume calculator to calculate a volume of the heavy liquid and a volume of the light liquid responsive to a length and a diameter from the minimum dimension retriever, and the minimum required light liquid level and the minimum required heavy liquid level from the minimum required liquid level retriever, the volume of the heavy liquid defining the calculated heavy liquid holdup volume and the volume of the light liquid defining the calculated light liquid holdup volume;

a vapor phase area calculator to calculate a calculated vapor phase area responsive to the length and diameter of the separator, and a calculated vapor phase height; and a length incrementor to incrementally increase the length the separator by a predetermined length incremental step so that increases in the separator length are no longer necessary to account for one or more parameters or conditions related to minimum vapor height, heavy liquid level, the minimum required light liquid level, the minimum required heavy liquid level, the rising time of the light liquid droplets in the heavy liquid, and a light liquid residence time.

19. Software according to claim 18, wherein the design conditions calculator calculates a required light liquid holdup volume and a required heavy liquid holdup volume, the software further comprising:

a heavy liquid level incrementor to incrementally increase the minimum required heavy liquid level in order for the calculated heavy liquid holdup volume to be at least as great as the required heavy liquid volume; and a light liquid level incrementor to incrementally increase the minimum required light liquid level in order for the calculated light liquid holdup volume to be at least as great as a required total light liquid volume.

20. Software to size a three-phase separator, stored on a non-transitory computer readable medium, the software comprising;

a design conditions calculator to calculate preselected design conditions related to a fluid entering a three-phase separator responsive to predetermined values entered by an operator;

a separation time calculator to calculate rising time of a plurality of light liquid droplets in a heavy liquid in the fluid entering the three-phase separator and settling time of a plurality of heavy liquid droplet in a light liquid in the fluid entering the three-phase separator responsive to a calculated light liquid holdup volume and a calculated heavy liquid holdup volume that are calculated by the design conditions calculator;

a terminal velocity calculator to calculate the terminal velocity of a vapor in the fluid entering the three-phase separator responsive to the predetermined values entered by the operator;

a required vapor flow area calculator to calculate the required vapor flow area responsive to the terminal velocity of the vapor;

a minimum dimension retriever to retrieve a smallest available length and a smallest available diameter for a separator from the database responsive to length to diameter ratios entered by the operator;

a minimum required liquid level retriever to retrieve a minimum required light liquid level and a minimum required heavy liquid level responsive to the smallest available minimum length and smallest available minimum diameter determined responsive to the length to diameter ratios;

a holdup volume calculator to calculate a volume of the heavy liquid and a volume of the light liquid responsive to a length and a diameter from the minimum dimension retriever, and the minimum required light liquid level and the minimum required heavy liquid level from the minimum required liquid level retriever, the volume of the heavy liquid defining the calculated heavy liquid holdup volume the volume of the light liquid defining the calculated light liquid holdup volume;

a vapor phase area calculator to calculate a calculated vapor phase area responsive to the length and diameter of the separator, and a calculated vapor phase heights;

a diameter incrementor to incrementally increase the diameter of the separator by a predetermined diameter incremental step so that increases in the separator diameter are no longer necessary for an associated length to diameter ratio to be less than the maximum length to diameter ratio; and a length incrementor to incrementally increase the length of the separator by a predetermined length incremental step so that increases in the separator length are no longer necessary for the smallest available minimum diameter to at least as great as a total of a minimum vapor height guess value, the minimum required light liquid level minus the minimum required heavy liquid level, and the minimum required heavy liquid level, incremental increases in the separator length are no longer necessary for the rising time of the light liquid droplets in the heavy liquid from the separation time calculator to be less than a heavy liquid resistance time and the settling time of the heavy liquid droplets in the light liquid from the separation time calculator to be less than a light liquid residence time, and incremental increases in the separator length are no longer necessary for the calculated vapor phase area from the vapor phase area calculator to be at least as great as the required vapor flow area from the required vapor flow area calculator.

21. Software according to claim 20, wherein the design conditions calculator calculates a required light liquid holdup volume and a required heavy liquid holdup volume, the software further comprising:

a heavy liquid level incrementor to incrementally increase the minimum required heavy liquid level in order for the calculated heavy liquid holdup volume to be at least as great as the required heavy liquid volume; and a light liquid level incrementor to incrementally increase the minimum required light liquid level in order for the calculated light liquid holdup volume to be at least as great as a required total light liquid volume.

* * * * *

UNITED STATES PATENT AND TRADEMARK OFFICE
CERTIFICATE OF CORRECTION

PATENT NO.        : 8,197,700 B2
APPLICATION NO.   : 11/647629
DATED             : June 12, 2012
INVENTOR(S)       : Mehryar Beyk Page 1 of 1

It is certified that error appears in the above-identified patent and that said Letters Patent is hereby corrected as shown below:

Column 22, Line 47, Claim 6 (i)
replace
"(i) incrementally increasing the minimum requited heavy"
with
"(i) incrementally increasing the minimum required heavy"

Column 29, Line 5, Claim 18
replace
"the separator by a predetermined length incremental step"
with
"of the separator by a predetermined length incremental step"

Column 29, Line 35, Claim 20
replace
"of a plurality of heavy liquid droplet in a light liquid in"
with
"of a plurality of heavy liquid droplets in a light liquid in"

Column 30, Line 11, Claim 20
replace
"holdup volume the volume of the light liquid defining"
with
"holdup volume and the volume of the light liquid defining"

Column 30, Line 15, Claim 20
replace
"of the separator, and a calculated vapor phase heights"
with
"of the separator, and a calculated vapor phase height"

Signed and Sealed this
Eleventh Day of September, 2012

David J. Kappos
*Director of the United States Patent and Trademark Office*